(12) United States Patent
Bourne et al.

(10) Patent No.: US 12,502,695 B2
(45) Date of Patent: Dec. 23, 2025

(54) APPLICATOR DEVICE FOR DISPENSING LIQUID OR GEL

(71) Applicant: Curia Ventures Pty Ltd, Unley (AU)

(72) Inventors: Charles Ivan Bourne, Carey Gully (AU); Neil Mullard, Uraidla (AU)

( * ) Notice: Subject to any disclaimer, the term of this patent is extended or adjusted under 35 U.S.C. 154(b) by 217 days.

(21) Appl. No.: 18/001,252

(22) PCT Filed: Jun. 9, 2021

(86) PCT No.: PCT/AU2021/050583
§ 371 (c)(1),
(2) Date: Dec. 8, 2022

(87) PCT Pub. No.: WO2021/248190
PCT Pub. Date: Dec. 16, 2021

(65) Prior Publication Data
US 2023/0286023 A1   Sep. 14, 2023

(30) Foreign Application Priority Data

Jun. 9, 2020 (AU) .............................. 2020901887
Oct. 21, 2020 (AU) .............................. 2020903808

(51) Int. Cl.
| | |
|---|---|
| *B08B 3/02* | (2006.01) |
| *A61L 2/18* | (2006.01) |
| *A61L 2/22* | (2006.01) |
| *A61L 2/26* | (2006.01) |
| *B05C 5/02* | (2006.01) |
| *B08B 3/04* | (2006.01) |
| *E04F 11/18* | (2006.01) |

(52) U.S. Cl.
CPC ............... *B08B 3/024* (2013.01); *A61L 2/18* (2013.01); *A61L 2/22* (2013.01); *A61L 2/26* (2013.01); *B05C 5/0241* (2013.01); *B05C 5/0275* (2013.01); *B08B 3/04* (2013.01); *A61L 2202/15* (2013.01); *A61L 2202/17* (2013.01); *E04F 11/18* (2013.01)

(58) Field of Classification Search
CPC .......... B08B 3/024; B08B 9/023; B62B 5/069
See application file for complete search history.

(56) References Cited

U.S. PATENT DOCUMENTS

| | | |
|---|---|---|
| 2010/0212094 A1 | 8/2010 | Cohen |
| 2011/0182769 A1 | 7/2011 | Rich |
| | (Continued) | |

FOREIGN PATENT DOCUMENTS

| | | |
|---|---|---|
| GB | 2446054 A | 7/2008 |
| WO | 2018/213884 A1 | 11/2018 |
| WO | WO2021191577 A1 | 9/2021 |

OTHER PUBLICATIONS

Supplementary European Search Report relating to counterpart EU patent application No. 21820916.
(Continued)

*Primary Examiner* — Spencer E. Bell
(74) *Attorney, Agent, or Firm* — Marcus N. DiBuduo; John R. Aaron

(57) ABSTRACT

The present invention relates to an applicator device for applying cleaning, sanitizing and/or disinfecting liquid or gel across an external surface of an elongate, three-dimensional object or cover therefor.

25 Claims, 16 Drawing Sheets

(56) References Cited

U.S. PATENT DOCUMENTS

2012/0274117 A1* 11/2012 Preisler ............ B29C 45/14811
                                                                                            428/483
2014/0076503 A1    3/2014   Mullet et al.
2016/0095948 A1    4/2016   Bord

OTHER PUBLICATIONS

International Search Report relating to international patent application no. PCT/AU2021/05083.
Written Opinion of the International Searching Authority relating to international patent application No. PCT/AU2021/05083.
International Preliminary Report on Patentability relating to international patent application No. PCT/AU2021/05083.
International-Type Search for Provisional Patent Application relating to AU patent application No. 2020903808.
Applicant's remarks made in response to the Written Opinion of the International Searching Authority relating to International patent application No. PCT/AU2021/05083.

* cited by examiner

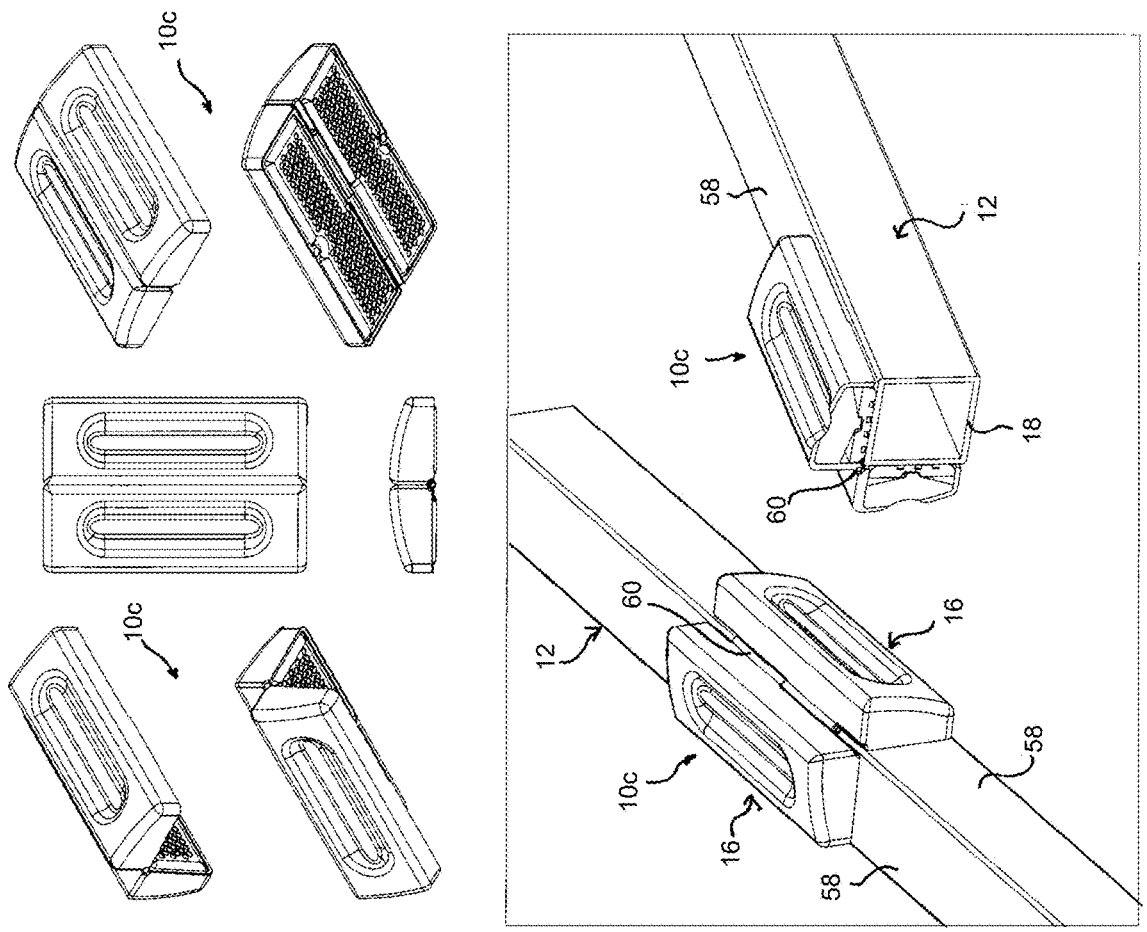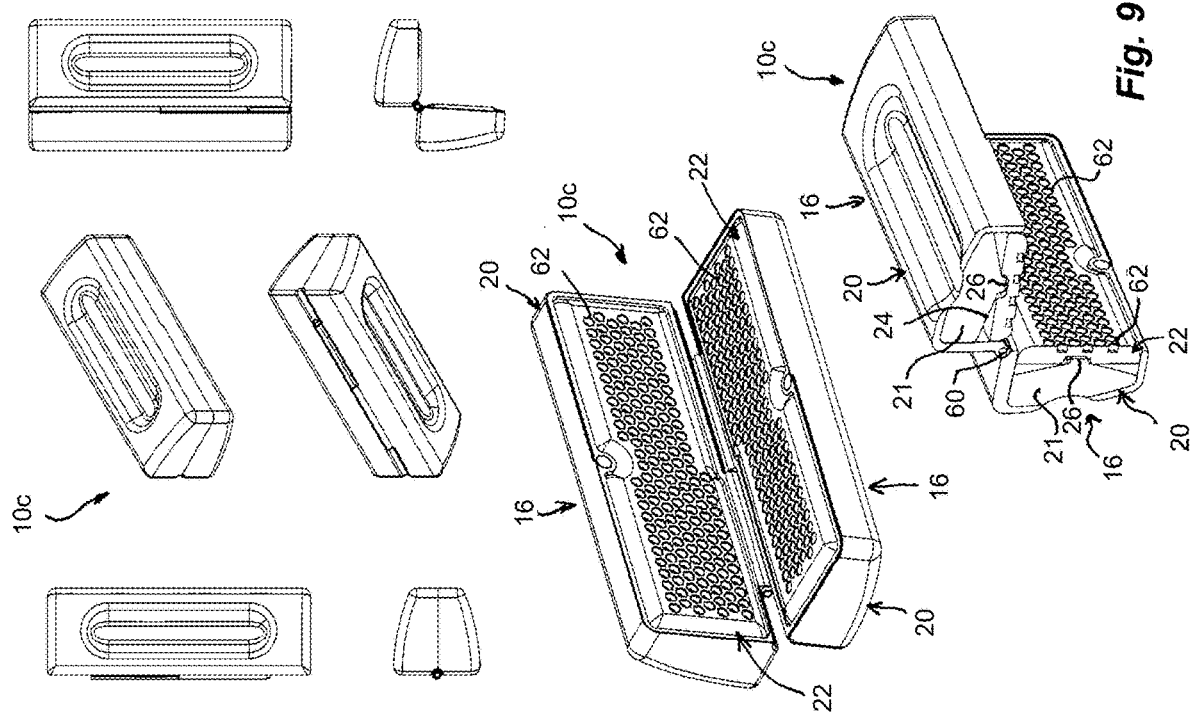
Fig. 9

APPLICATOR DEVICE FOR DISPENSING LIQUID OR GEL

FIELD OF THE INVENTION

The present invention relates to an applicator device for dispensing cleaning, sanitizing and/or disinfecting liquid or gel across an external surface of an elongate, three-dimensional object or cover therefor.

BACKGROUND OF THE INVENTION

There exist a variety of diseases that humans can contract as a result of coming into contact with virus strains (e.g. viral infections such as the common cold and flu) or dangerous bacteria (e.g. bacterial infections). Once contracted by humans, disease symptoms can vary depending on factors such as the type of disease, the age and health status of the carrier, and various other factors. In mild cases, the symptoms may include mild flu-like symptoms, gastrointestinal effects, discomfort, and loss of productivity. In more serious cases, symptoms can require treatment in hospital, and result in permanent health problems or even death.

Bacteria and viruses can spread by human-to-human contact and also human-to-surface contact where the bacteria or virus can be picked up through contact with surfaces on which the bacteria or virus exists in an active state. Germs associated with bacteria, viruses, fungi, protozoa, etc., that are capable of causing disease, can be transferred from a dry smooth surface to a clean hand well after the surface has been contaminated.

Vaccinations have been developed for some strains of virus, but there continue to exist viruses and associated strains for which vaccinations do not exist and may never be successfully developed. Viruses can spread through respiratory droplets when an infected person coughs, sneezes or speaks. People can also be infected by touching a contaminated surface and then, for example, their eyes, mouth or nose.

It is well understood that hand hygiene is paramount to mitigating the risk of virus and bacteria transmission, with hand washing using soap and the use of hand sanitizers considered among the best preventative measures. Hand sanitizers are often used on hands prior to and/or after contacting a surface in an effort to kill virus or bacteria that may have been transmitted onto the hands. There are also several anti-bacterial cleaning products available that are used to clean, sanitize and/or disinfect surfaces before and after human contact, with varying levels of strength and effectiveness.

Hand sanitizers are usually in the form of liquid or gel containing a sufficient amount of alcohol (predominantly ethanol) to kill or reduce the number of germs and bacteria. In the case of hand sanitizers, sanitizing liquids and gels are often stored in a handheld applicator for portable use (e.g. handheld tubes or squeeze bottles), or in a fixed station dispenser which is more often used in public areas such as hospitals, offices and grocery stores. Fixed station dispensers may be mechanically driven, where a user is required to manually cause liquid or gel to be dispensed, or automatic such that liquid or gel is dispensed based upon sensing the presence of a hand within a particular vicinity.

However, the Applicant has recognised a number of deficiencies associated with existing means of preventing or minimising the occurrence of human-to-surface or surface-to-human transmission of germs associated with virus and bacteria.

The problem with most hand sanitizer bottles, applicators, etc., is that they are designed for applying liquid or gel to human hands only and not onto surfaces. Therefore, whilst effective in killing or reducing the number of germs and bacteria on a user's hands and thereby preventing or minimising the occurrence of human-to-surface transmission (i.e. after the hand sanitizer has been applied), they have limited effect in preventing, minimising or addressing the occurrence of surface-to-human transmission.

Even if one applied hand sanitizer to an object, such as a shopping trolley handle for example, the user would be required to rub the sanitizer along the length of the handle and thereby engage in prolonged contact with the handle using their hands to ensure the sanitizing liquid or gel sufficiently covers the entire surface. This is also very likely to result in a significant mess and wastage of sanitizing liquid/gel. Whilst a tissue or hand towel could be used to smear the liquid/gel over the entire surface, the tissue/towel represents yet another item that the user needs to carry or be supplied with.

A contamination risk remains in that the user is unlikely to ensure that the majority of the surface area of the handle has received the necessary amount of sanitizing liquid or gel, and the same applies to adjacent components of the trolley such as adjacent rail components that the user may contact. Accordingly, even if the user was very cautious and applied hand sanitizer to their own hands as well as the trolley handle, in the event a portion of the handle remained contaminated, the user may remain at risk of contacting the contaminated surface and picking up the virus or bacteria after the effect of the sanitizer on their hands wears off. In this regard, it is estimated that hand sanitizer has effect, on average, for a period of approximately two minutes.

Since hand sanitizer has effect for a relatively short period of time, there is also a problem associated with interactions giving rise to contamination after the initial application of hand sanitizer has worn off. For example, a shopper may become contaminated following an interaction with another shopper, or one or more shelf items, during their visit to a grocery store. If such an interaction occurs after the initially applied sanitizer has worn off, then the shopper remains at risk. In this regard, the Applicant has recognised a need for facilitating the quick and easy re-application of liquid or gel onto a manually handled surface, such as a shopping trolley handle, to allow a user's hands to become re-sanitised during the course of their visit to a particular location.

The abovementioned problems apply to other three-dimensional objects that a user may encounter, such as hand rails and balustrades. Attendance at a hospital, for example, may involve handling hand rails located in hospital aisles. Similarly, attendance at a sports stadium may involve handling rails and balustrades when walking to and then lining up to certain locations such as toilets or shops within the stadium. Since such objects are likely to be contacted by several hundreds or thousands of people without being sanitized after each contact, they are very likely to give rise to human-to-surface transmission and surface-to-human transmission. Whilst this problem could be addressed by having personnel permanently placed at the various locations to sanitize the surfaces following each contact instance, this is not practical and likely to result in significant additional cost for the venue and may affect the commercial viability of the venue and/or event.

Furthermore, the Applicant is not aware of any liquid or gel dispensing product that is truly compact and portable and capable of being stored away in a user's pocket or bag, for example, for use on surfaces as and when required.

It is therefore an object of the present invention to overcome, or at least ameliorate, one or more of the above-mentioned problems or provide the public with a useful alternative.

SUMMARY OF THE INVENTION

In a first aspect, the present invention provides an applicator device for applying a cleaning, sanitizing and/or disinfecting liquid or gel to an external surface of an elongate three-dimensional object or a cover configured to extend over the three-dimensional object, the applicator device including:
one or more sections that form a shape substantially contoured with a cross-sectional shape of the three-dimensional object, or cover therefor, to enable the one or more sections to engage with the external surface, each or a combination of the one or more sections including:
one or more hollow reservoir bodies configured to hold said liquid or gel; and
a non-absorptive internal wall having associated therewith one or more applicators in operable communication with the one or more reservoir bodies to facilitate transfer of the liquid or gel from inside each reservoir body onto the external surface,
wherein the one or more applicators are configured such that transfer of the liquid or gel from inside each reservoir body onto the external surface occurs through the one or more applicators in response to the applicator device being moved along the elongate three-dimensional object or cover.

In an embodiment, the applicator device is shaped to substantially correspond with at least a portion of the cross-section of the three-dimensional object or cover, and thereby enables at least partial engagement with the object or cover.

In an embodiment, each applicator device is a spray-type applicator which is activated to impart a burst of air and liquid from inside one or more of the reservoir bodies onto the external surface in response to movement of the device along the elongate three-dimensional object or cover.

In an embodiment, the external surface of the object or cover includes one or more radial protrusions to facilitate movement of the applicator device along the elongate three-dimensional object or cover, and uniform application of the liquid or gel upon the external surface.

In an embodiment, the one or more radial protrusions are in the form of one or more raised rifling lines that spiral around the external surface of the object or cover along its length, the rifling lines imparting a rotary motion to the applicator device as it is caused to move along the length of the elongate object or cover.

In an embodiment, the rifling is a double, triple or quadruple helix rifling.

In an embodiment, each of the one or more applicators includes a substantially hollow housing that extends into the reservoir body.

In this embodiment, the one or more applicators are moulded into the one or more inserts.

In an embodiment, the one or more applicators are in the form of one or more roller ball applicators.

In this embodiment, the substantially hollow housing includes a first end that extends into the reservoir body and houses a ball at an opposing end, wherein:
the ball is positioned such that the ball makes rolling contact with the external surface when the applicator device is engaged with the external surface and is moved therealong, and
when the applicator device is moved along the object or cover for applying cleaning, sanitizing and/or disinfecting liquid or gel onto said external surface, the ball rotates and thereby causes liquid or gel from inside the reservoir body to be transferred into the hollow housing, around the ball, and onto the external surface.

In a further alternate embodiment, the one or more applicators are in the form of one or more pressure flap applicators.

In this embodiment, the substantially hollow housing includes a first end that extends into the reservoir body and terminates in X-shaped flaps at an opposing end which in their normal state do not allow flow of liquid or gel therethrough, wherein:
the X-shaped flaps are positioned such that when a sufficient pressure from liquid or gel that is caused to move from the reservoir body into the hollow housing and towards the X-shaped flaps is applied, the flaps open and thereby allow liquid or gel from inside the reservoir body to be transferred into the hollow housing, through the open flaps, and onto the external surface, and
the X-shaped flaps return to their original state once application of said pressure ceases.

In a yet further alternate embodiment, the plurality of applicators are in the form of one or more tapered slit-type applicators.

In this embodiment, the substantially hollow housing includes a first end that extends into the reservoir body and at an opposing end terminates in a tapered surface having a slit which in its normal state does not allow flow of liquid or gel therethrough, wherein:
the tapered surface and associated slit are configured such that the tapered surface makes contact with the external surface when the applicator device is engaged with the external surface and is caused to be moved therealong, and
when the applicator device is moved along the object or cover for applying cleaning, sanitizing, and/or disinfecting liquid or gel onto said external surface, the contact between the tapered surface and the external surface causes liquid or gel from inside the reservoir body to be transferred into the hollow housing, through the slit, and onto the external surface.

In a still further alternate embodiment, the one or more applicators are in the form of one or more spray-type applicators.

In this embodiment, the substantially hollow housing includes a first end that extends into the reservoir body and at an opposing end terminates in a bulb including a plurality of apertures which in their normal state do not allow flow of liquid or gel therethrough, wherein:
the plurality of apertures are configured such that when a sufficient pressure from liquid or gel that is caused to move from the reservoir body into the hollow housing and towards the plurality of apertures is applied, the plurality of apertures allow liquid or gel from inside the reservoir body to be transferred into the hollow housing and onto the external surface by way of a burst of air and liquid or gel through the plurality of apertures, and ceases.
said burst of air and liquid or gel ceasing once application of said pressure ceases.

In an embodiment, the substantially hollow housing includes a cup at the reservoir body end of the housing, the cup configured to temporarily hold a volume of liquid or gel prior to transfer of same through the applicator onto the external surface.

In an embodiment, the one or more reservoir bodies include a means of facilitating flow into each cup in the form of an inwardly directed protrusions associated with the reservoir body outer wall, each inwardly directed protrusion facilitating flow by:
- being located in a position substantially coaxial with each cup to direct liquid/gel therein, and/or
- extending at least partially into the cup.

In an embodiment, the cup is castellated and the inwardly directed protrusion is in the form of a protruding pin including at least one web portion that terminates in a nipple extending a short distance into the cup in alignment with a space defined by radially opposed pairs of adjacent cup castellations.

In an embodiment, the at least one web portion includes a main web portion that terminates in said nipple and additional reinforcing web portions which together form a substantially cross-shaped pin, wherein two or more of the pins disposed inside each reservoir body are linked by a rail portion.

In an embodiment, when the external surface of the object or cover includes one or more radial protrusions to facilitate movement of the applicator device, each applicator associated with the non-absorbent insert(s) is separated radially by an angle that substantially corresponds with an angle of radial separation between each rifling line.

In an embodiment, once the applicator device is engaged with the object, the distance that each applicator extends inwardly from the non-absorbent inserts substantially corresponds with a distance to which each rifling line extends outwardly from the external surface such that each rifling line acts as a guide for each corresponding applicator and substantially prevents the corresponding applicator from crossing over the corresponding rifling line and instead causes the applicator to move alongside the rifling line which imparts said rotary motion to the applicator device.

In an embodiment, each non-absorbent insert further includes a slide attachment extending along an internal surface thereof and dimensioned to fit inside a spiral channel formed between at least two adjacent raised rifling lines, the raised rifling lines thereby acting as a guide for the slide to move through the spiral channel.

In an embodiment, the slide is sufficiently raised from the internal surface of the non-absorbent insert to cause liquid or gel that has been applied by one or more applicators to be spread across the surface of the corresponding channel.

In an embodiment, the applicator device includes two sections and one or more associated biasing means that cause the two sections to be rotatably biased in a direction towards one another an engaged position on the three-dimensional object or cover.

In an embodiment, movement of the applicator device along the elongate three-dimensional object or cover is achieved manually.

In an alternate embodiment, movement of the applicator device along the elongate three-dimensional object or cover is achieved by a drive means associated with the applicator device.

In an embodiment, the drive means is a drive motor housed inside an end unit of the applicator device, the drive motor causing an associated drive wheel to rotate, the drive wheel positioned such that the drive wheel makes frictional contact with the object or cover external surface and rotation thereof causes the applicator device to move relative to the external surface.

In an embodiment, the one or more non-absorbent inserts are constructed of a rubber-like material such as Santoprene™ or any suitable flexible material.

In an embodiment, the applicator device includes two sections connected by an articulated hinge which enables spaced apart distance between the two sections to be adjustable such that the device contours to different cross-sectional shapes and/or dimensions.

In an embodiment, the applicator device is cross-sectionally shaped to engage with three-dimensional objects of a corresponding cross-sectional dimension, including square, rectangle, circle or oval.

In an embodiment, each reservoir body is made of a transparent material to enable a user to view a level of liquid or gel in the reservoir body.

In an embodiment, each reservoir body is deformable and made of a resilient material.

In an embodiment, the reservoir body is made of a plastic material such as polypropylene, polyethylene (high or low density), polyethylene terephthalate, or polylactic acid.

In an alternate embodiment, the reservoir body is not deformable and constructed of a non-resilient material such as stainless steel.

In an embodiment, the liquid or gel is made up of a composition for cleaning, sanitizing and/or disinfecting the external surface of the three-dimensional object or cover, or any additional object or surface to which the composition is subsequently transferred.

In an embodiment, the applicator device is configured for single use whereby each reservoir body is filled with liquid or gel and is not refillable.

In an alternate embodiment, the applicator device is re-usable whereby the reservoir body includes an access valve or lid that enables the reservoir body to be refilled with liquid or gel.

In an embodiment, the applicator device is stored in a correspondingly sized pouch or container.

In a second aspect, the present invention provides an applicator device for applying a cleaning, sanitizing and/or disinfecting liquid or gel to an external surface of a cover that extends over an elongate three-dimensional object of circular or oval cross-section, the cover including raised rifling lines that journal around the external surface of the cover along its length, the applicator device including:
- one or more sections that together form an annular shape configured to encircle the elongate object, wherein each or a combination of the one or more sections includes:
  - a hollow reservoir body configured to hold said liquid or gel,
  - one or more non-absorbent inserts forming an inner wall of the reservoir body and including one or more applicators that facilitate transfer of the liquid or gel from inside the reservoir body onto the external surface, wherein:
    - each applicator is separated radially by an angle that substantially corresponds with an angle of radial separation between each rifling line, and
    - the distance that each applicator extends inwardly from the one or more non-absorbent inserts substantially corresponds with a distance to which each rifling line extends outwardly from the external surface such that each rifling line acts as a guide for each corresponding applicator such that when the applicator device is moved longitudinally the applicator is substantially prevented from crossing over the corresponding rifling line which instead causes the applicator to move along the rifling line to impart a rotary motion to the applicator device; and wherein the one or more applicators are configured such that application of the cleaning, sanitizing and/or disinfecting liquid or gel onto said external surface occurs through the one or more applicators in response to the device being moved along the rifled cover.

In a third aspect, the present invention provides a liquid/gel applicator assembly for a three-dimensional elongate object, the assembly including a cover for the three-dimensional elongate object, the cover configured to extend over the object and including one or more raised rifling lines that journal around the external surface of the cover along its length, and an applicator device including one or more sections that together form a shape substantially corresponding with the cross-sectional shape of the cover, wherein each or a combination of the one or more sections includes a hollow reservoir body configured to hold cleaning, sanitizing and/or disinfecting liquid or gel, a non-absorptive insert disposed in the device and forming an internal wall that is configured in accordance with the non-absorptive internal wall defined in any one of the preceding statements, and wherein the one or more applicators are configured such that application of the cleaning, sanitizing and/or disinfecting liquid or gel to the external surface occurs through the one or more applicators in response to the device being moved along the cover.

In a fourth aspect, the present invention provides an elongate, three-dimensional object, or a cover therefor, having an external surface, the three-dimensional object or cover therefor including:

an applicator device configured in accordance with any one or more of the preceding statements for applying a sanitizing liquid or gel to the external surface in response to the applicator device being moved along the object or cover.

BRIEF DESCRIPTION OF THE DRAWINGS

Embodiments of the invention are described in further detail with reference to the accompanying figures in which the event is a sporting event and the physical environment and objects therein are generated and represented in three dimensions. In this regard:

FIG. 9 illustrates various views of an applicator device configured in accordance with a still further embodiment of the present invention, including various views of the device in use on an elongate three-dimensional object of square cross-section.

DETAILED DESCRIPTION OF EMBODIMENT(S) OF THE INVENTION

Figure 1:
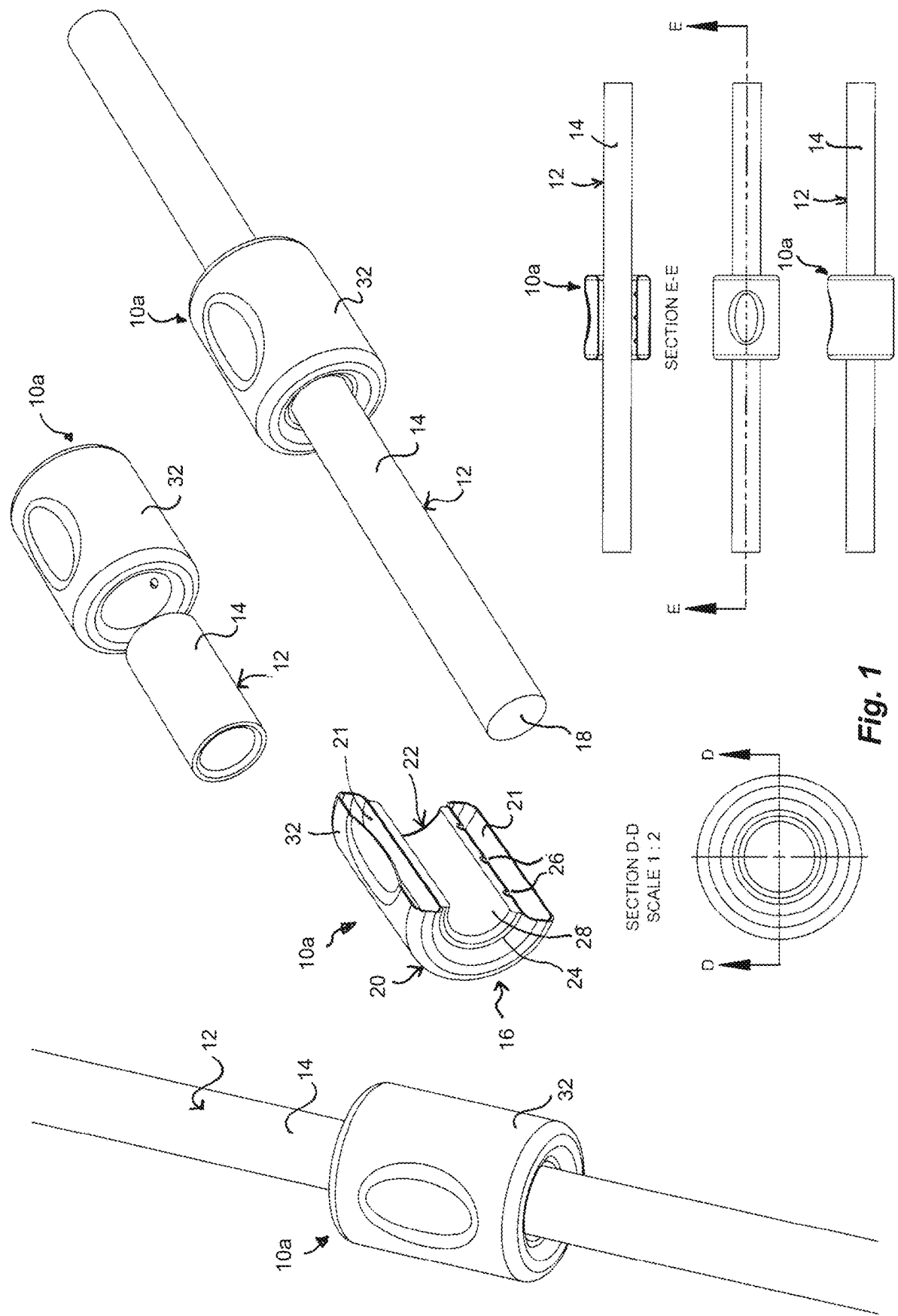
FIG. 1 illustrates various views of an applicator device configured in accordance with an embodiment of the invention in use on an elongate three-dimensional object.

Reference to "cleaning" liquid or gel herein is not strictly limited to formulations which remove germs, dirt and impurities, and may well include stronger formulations such as sanitizers (i.e. to reduce the number of germs on a surface or object to a safe level) and disinfectants that disinfect surfaces or objects (i.e. kill germs). In other words, the word "cleaning" and any variations thereof are used in this specification to describe one or more of cleaning, sanitizing and disinfecting. Furthermore, it is to be understood that reference to "applying" a cleaning, sanitizing and/or disinfecting liquid or gel to a surface may achieve a number of different outcomes. For example, the application of liquid or gel may be to simply assist the cleaning of a surface. In an alternate embodiment, the application of liquid or gel may be to cause the liquid or gel to be applied to the surface for the purpose of sanitizing or disinfecting the surface. In a yet further embodiment, the application of liquid or gel may be specifically to enable subsequent transfer of the liquid or gel to another object or surface, e.g. subsequent transfer from the surface to which the liquid or gel is applied to a user's hands (when the user handles the surface).

The present invention relates to an applicator device 10 configured to be moved (slid) manually or automatically across an elongate three-dimensional object, e.g. a rail or shopping trolley handle, to apply a cleaning, sanitizing and/or disinfecting liquid or gel (not shown) to an external surface 14 of the three-dimensional object 12 or an object configured to cover the three-dimensional object (also referred to herein as a "cover"). The applicator device 10a includes one or more sections 16 that form a shape that is substantially contoured with a cross-sectional shape 18 of the three-dimensional object 12 to enable the one or more sections 16 to engage at least a portion of the cross-sectional shape. Each, or a combination, of the one or more sections 16 includes a hollow reservoir body 20 configured to hold, in an internal chamber 21 thereof, the liquid or gel, and a transfer means 22 which substantially lines an inner wall 24 of the reservoir body 20, as described with reference to the embodiments of FIGS. 1-10, or forms part of the inner wall, as described with reference to the embodiments of FIGS. 11-16.

The transfer means 22, which may be in the form of an absorbent pad that lines the reservoir body 20, or a non-absorbent insert that forms the inner wall of the reservoir body, for example, is in operable communication with the internal chamber 21. For example, in the case of the absorbent pad embodiments, one or more openings 26 may be disposed in the reservoir body inner wall 24 to facilitate transfer of the liquid or gel from inside the chamber 21 to the absorbent transfer means 22 and then onto the external surface 14. In the case of the non-absorbent insert embodiments of FIGS. 11-16, applicators 27 associated with the one or more inserts may be used to facilitate such transfer.

Figure 10:
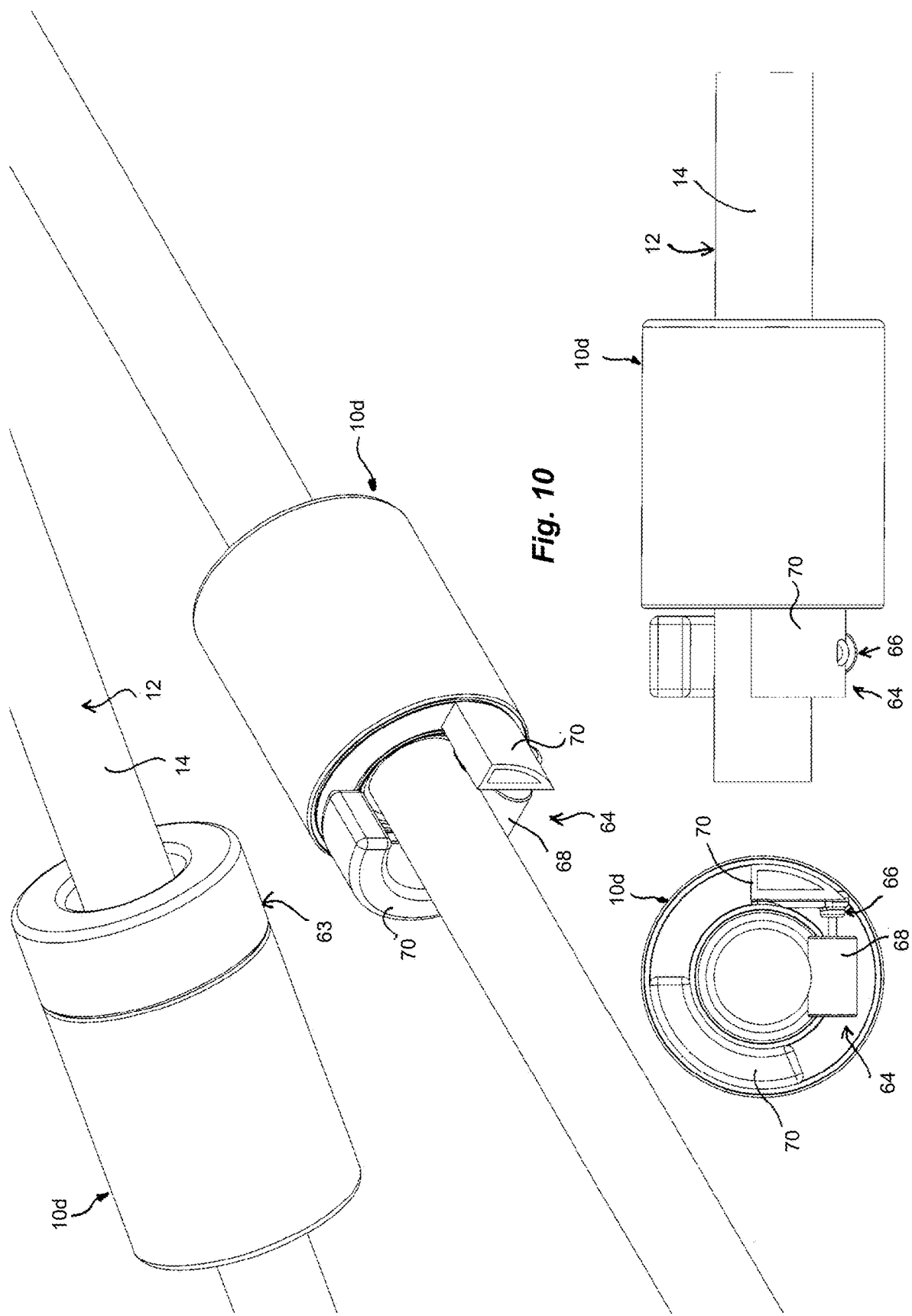
FIG. 10 illustrates an applicator device according to a further object of the present invention wherein the applicator device includes a drive unit for automating sliding movement of the device along the three-dimensional object.

It will be appreciated that the applicator device embodiments 10a shown in FIGS. 1 to 4, 10b shown in FIGS. 5 to 8, 10d shown in FIGS. 10, and 10e shown in FIGS. 11 to 16, are shaped to substantially correspond with at least a portion of the cross-section 18 of the three-dimensional object 12 to which cleaning, sanitizing or disinfecting liquid or gel is being applied, and thereby enables at least partial engagement with the object 12. It will also be appreciated that the cross-sectional shape of the object 12 need not necessarily be limited to a circular cross-section, and the embodiment 10c relating to FIG. 9 (as described in greater detail below) is an example of use of a similar device configured for use on a 3-dimensional object of square cross-section.

As mentioned above, the transfer means 22 may be in the form of an absorbent pad that lines an inner wall 24 of the reservoir body 20 and is thus arranged such that, when the applicator device is attached to or engages with the three-dimensional object 12, the transfer means 22 is disposed between the object 12 and the reservoir body 22 in a position that facilitates the transfer of liquid or gel. This configuration is present in each of the applicator devices 10a to 10d. In this regard, the reservoir body 20 may include a series of openings 26 along its inner wall such that liquid or gel that exits the internal chamber 21 of the reservoir body 20 through the series of openings 26 will come into contact with the absorbent transfer means 22. It is to be understood that the present invention is not limited to any particular number, position and/or size of such openings 26, provided the openings are configured in a manner that enables transfer of a volume of liquid or gel to the transfer means 22 sufficient to ensure that the transfer means holds sufficient moisture across its contact surface 28, i.e. the surface that makes direct contact with the external surface 14 of the object 12.

The embodiment 10a shown in FIGS. 1-4 is an example of a single section, closed annular device that is designed to engage an elongate object 12 around its full circumference, such that installation of the device 10a requires installing the device over an end of the object 12. Therefore, in the case of a supermarket trolley 30 such as that shown in FIGS. 3 and 4, it will be appreciated that one end of the trolley handle will need to be disassembled to allow for installation of the applicator device 10a, i.e. to enable the trolley end to effectively be inserted through the device. Where a new trolley is being manufactured, the applicator device 10 may well be manufactured as a component that is integrated into the handle.

However, the applicator device 10a of FIGS. 1 to 4 may include an alternate design (not shown) which does not require dismantling of the trolley handle in respect of existing trolleys. For example, the device could include a single section having an open annular configuration, whereby the device includes an opening along its length and the device is sufficiently resilient to allow a user to manually "snap" the applicator device 10 onto the elongate object by causing the object to enter through the opening. It will be appreciated that where the device 10 includes such an opening, the transfer means 22 will not extend around the entire circumference of the circular cross-section of the handle. Irrespective, one can rotate the applicator device whilst sliding the device along the length of the elongate object 12 to ensure uniform application of liquid or gel.

The skilled person will appreciate that the liquid or gel contained inside the internal chamber 21 of the reservoir body 20 may be caused to be released from inside the reservoir body through the one or more openings 26 by applying an external force (e.g. manual force) against the outer wall 32 of the reservoir body 20, and the outer wall 32 may include one or more dimples 34 to facilitate same. The skilled person would also understand that applying a force manually to the reservoir body will cause the body to deform, thereby decreasing the available volume in chamber 21 and forcing liquid or gel to exit the chamber 21 through the one or more openings 26. However, as will become apparent, there may be instances where a force is not required to be applied and liquid or gel may be dispensed as a result of the movement (e.g. rotation) of the device, and/or by causing the transfer means to interact with the object 12 in a manner that causes or facilitates liquid or gel to be dispensed.

Accordingly, there may be benefits associated with causing the applicator device 10a to rotate during movement across the external surface 14, e.g. to cause liquid or gel to be dispensed without having to press the device. In this regard, rotary motion may be imparted manually or by providing the three-dimensional object 12 with, for example, raised rifling that journals around the object 12 along its length. Such rifling may cause the applicator device 10a to rotate as it slides along the object 12. In the embodiment shown in FIGS. 2 to 4, the object 12 includes a triple helix rifling pattern, but other types of radially extending protrusions and patterns may be feasible.

Figure 2:
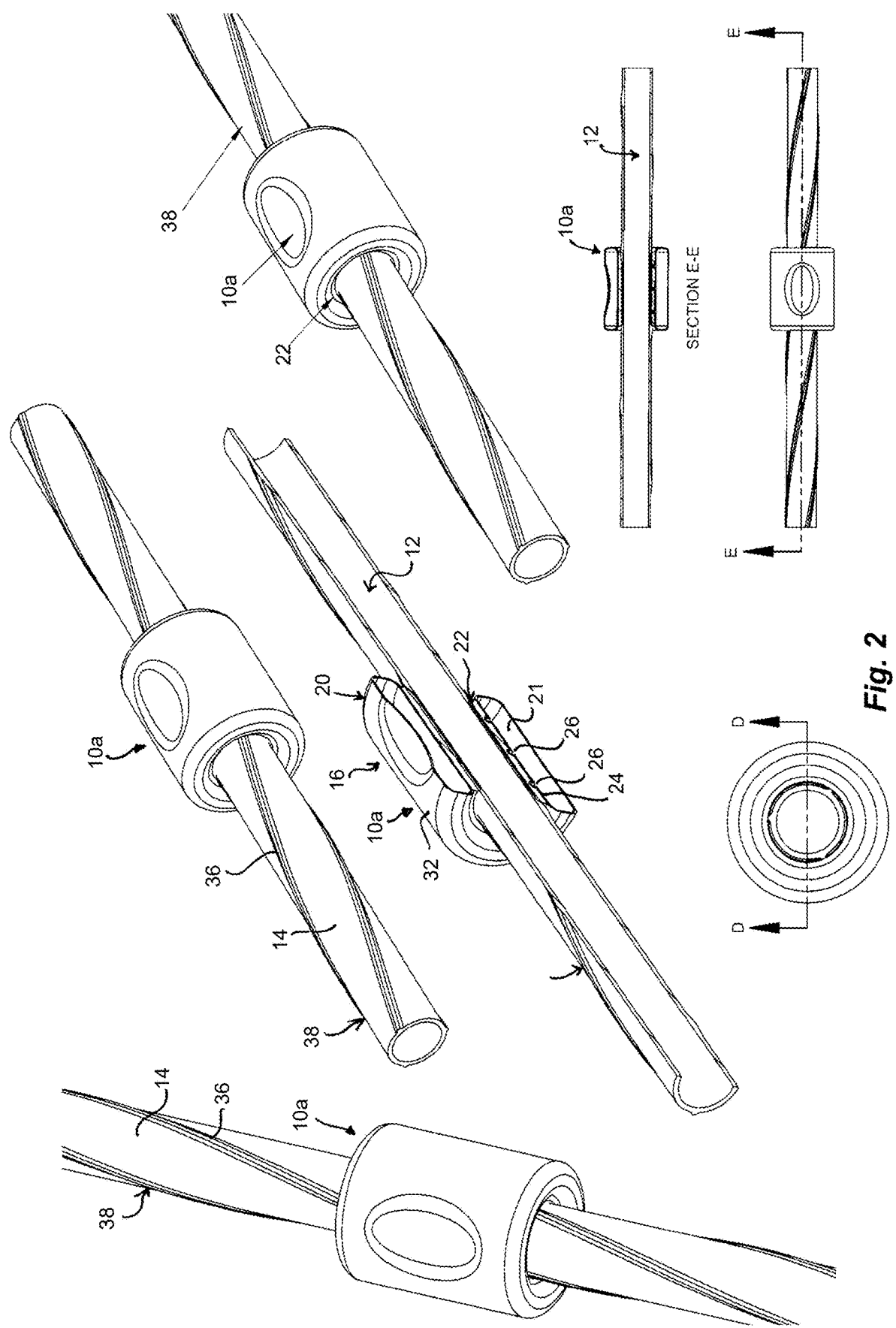
FIG. 2 illustrates the applicator device of FIG. 1 in use on a rifled elongate three-dimensional object.
Figure 3:
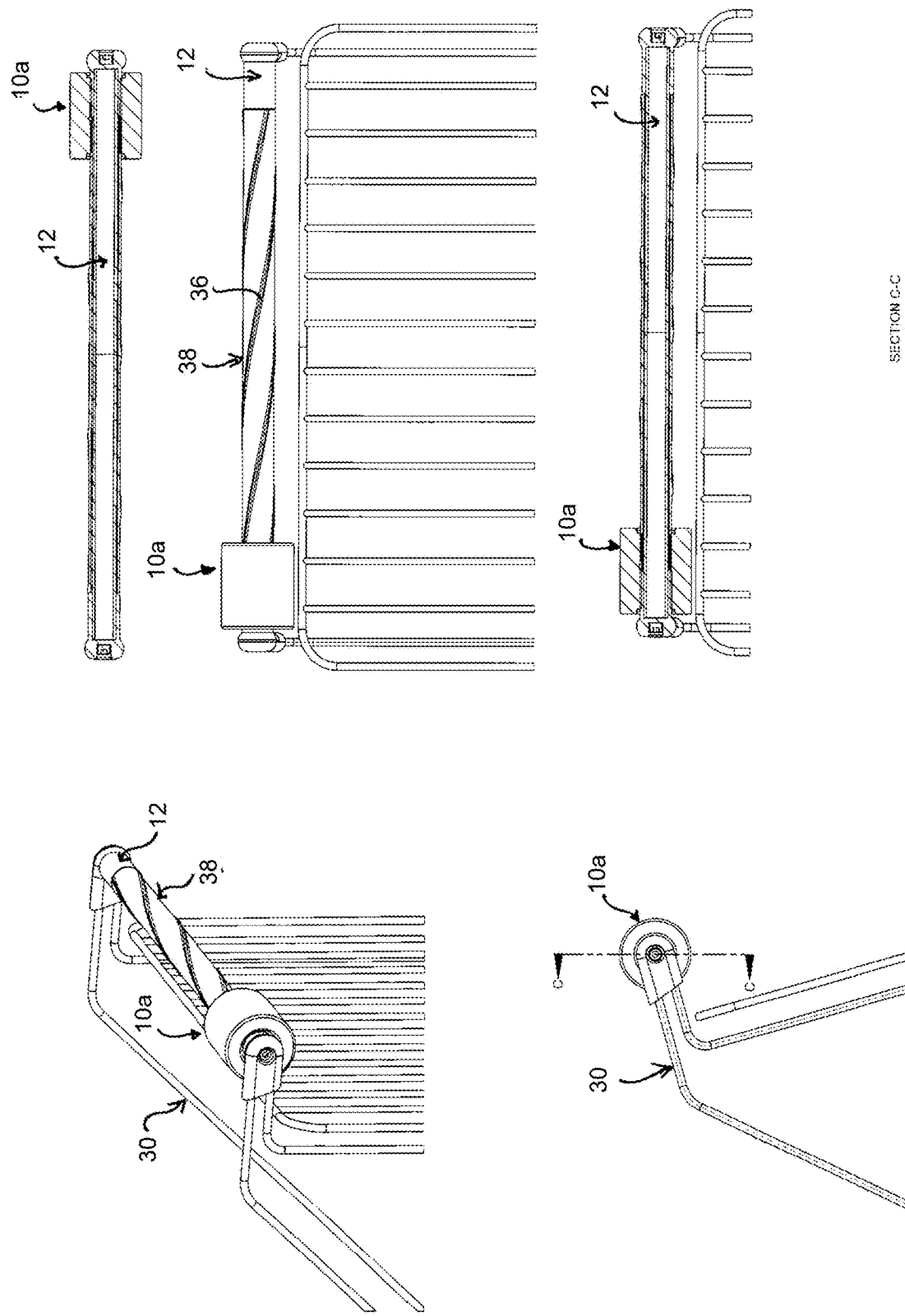
FIG. 3 illustrates the applicator device of FIGS. 1 and 2 in use on an elongate object in the form of a trolley handle, wherein the trolley handle includes a triple-helix rifled cover.
Figure 4:
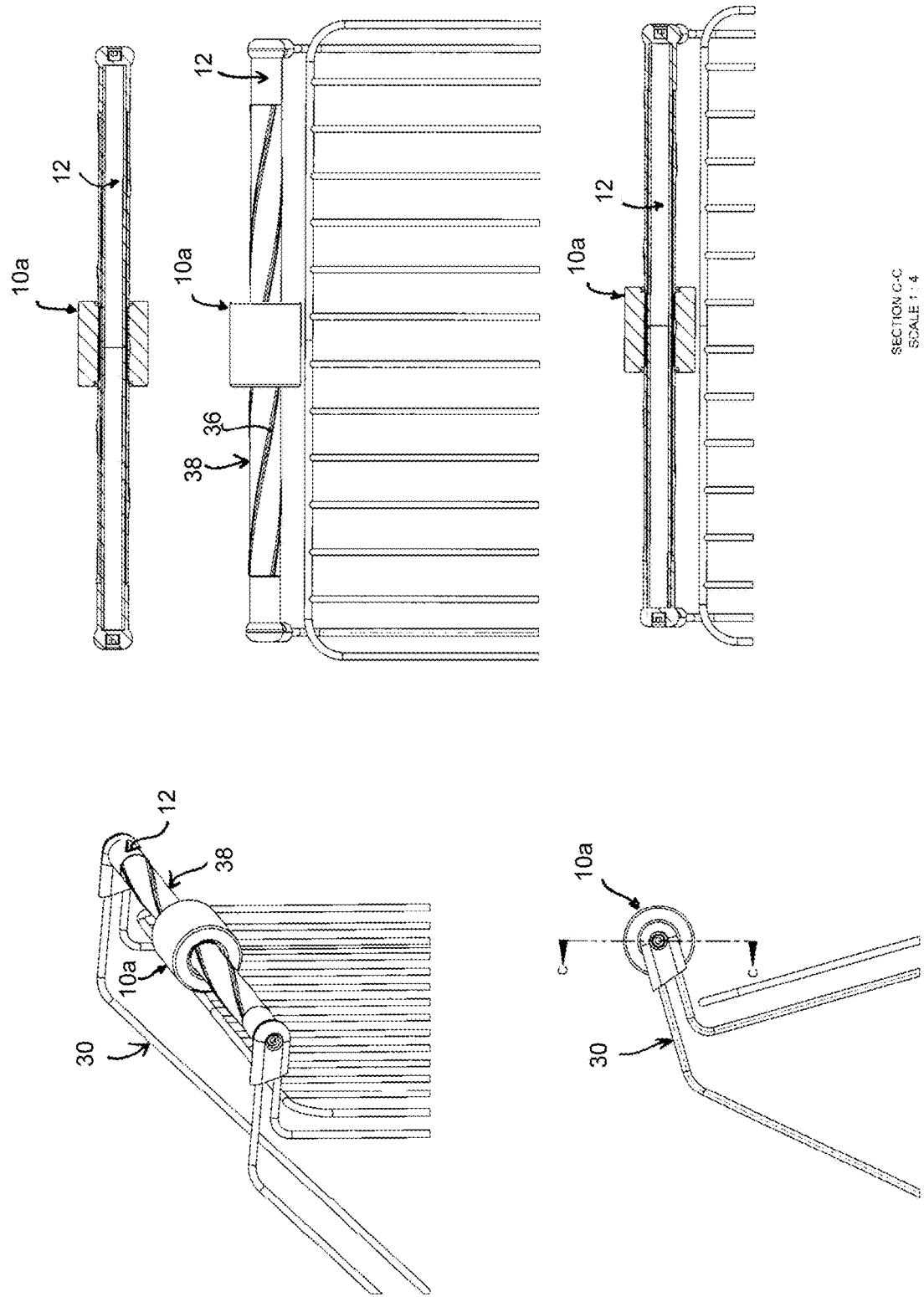
FIG. 4 illustrates the same embodiment as FIG. 3 but with the applicator device in a second position after having been moved from the original position shown in FIG. 3.
Figure 5:
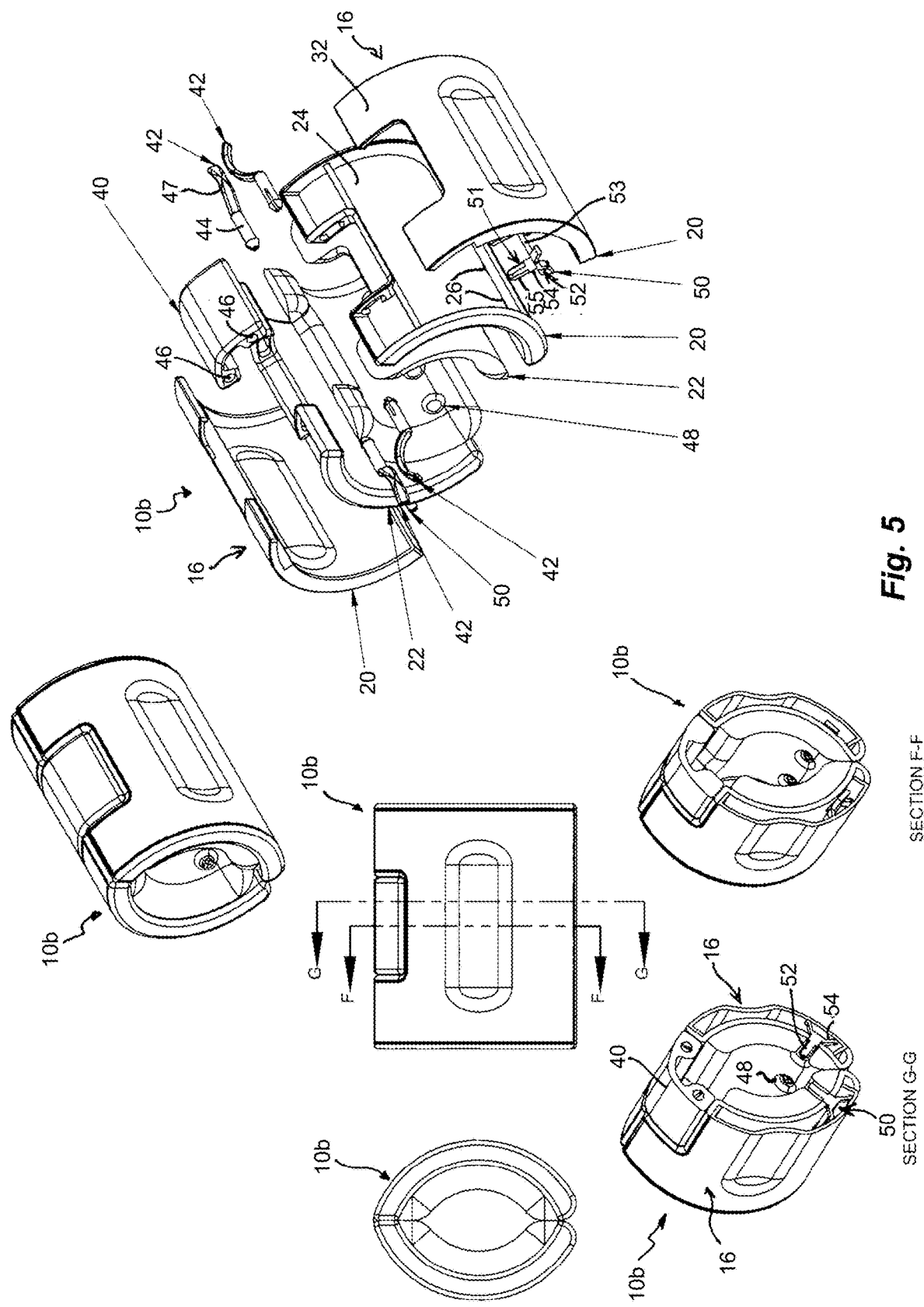
FIG. 5 illustrates various views of an applicator device configured in accordance with a further embodiment of the present invention.

As shown in the embodiments of FIGS. 2-4, a rifled surface may be provided to an otherwise planar object such as a shopping trolley handle through use of a cover 38 adapted to be fitted over the handle (e.g. by inserting a flexible cover over an end of an existing shopping trolley handle and pulled over, or by clamping a rigid cover to the handle). In this way, the external surface 14 to which cleaning, sanitizing or disinfecting liquid or gel needs to be applied is associated with the cover rather than the object 14. In addition to providing increased and uniform coverage with respect to the application of liquid or gel (due to the rotation imparted on the device), the rifling 36 may facilitate movement of the applicator device in that it may prevent the device from locking up during movement. Whilst journaled rifling may have advantages, there may be circumstances in which non-journaled rifling is sufficient to facilitate movement of the applicator device.

The use of a radially extending protrusion on the object, such as raised rifling, may also act as a facilitator for releasing liquid or gel from inside the reservoir body 20, i.e. by deforming the absorbent transfer means 22 as it moves over the protrusions and effectively squeezing liquid or gel out from the absorbent material.

FIGS. 5 to 8 illustrate an applicator device 10b configured according to an alternate embodiment involving two sections 16 rather than an annular ring shape as per the first embodiment. Each of the two sections 16 is of a half-annular construction and enables the device 10 to be clamped onto an elongate object 12 of, for example, circular or oval shaped cross-section, or a cover associated therewith. Components associated with the device 10b of FIGS. 5-8 are described using the same reference numerals as device 10a when the components are identical and/or perform a similar function.

According to this second embodiment, the two hinged half-annular sections 16 together form an annular shape configured to substantially encircle the elongate object 12. Each of the sections 16 includes its own individual reservoir body 20 and transfer means 22, although the device 10b could equally be constructed so as to share a reservoir body. The two sections 16 are hinged by a hinge member 40 with which each section 16 is rotatably associated, causing each section to be rotatable with respect to the hinge member and hence each other, enabling the device to be clamped onto the elongate object 12.

Figure 6:
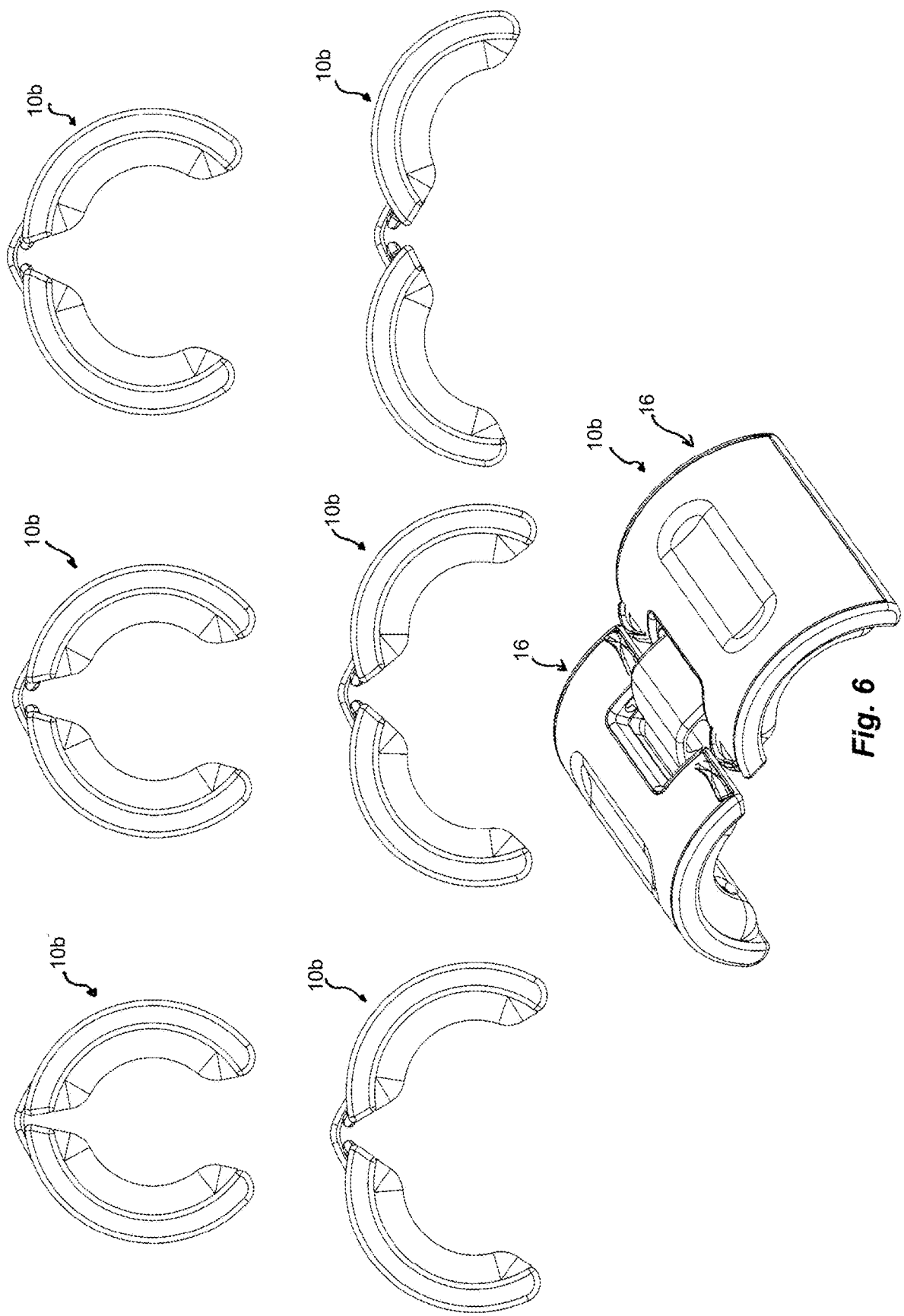
FIG. 6 illustrates the applicator device of FIG. 5 demonstrating the extent to which the rotatable device sections are able to be rotated and also separated apart in order to accommodate objects of varying cross-sectional dimension.
Figure 7:
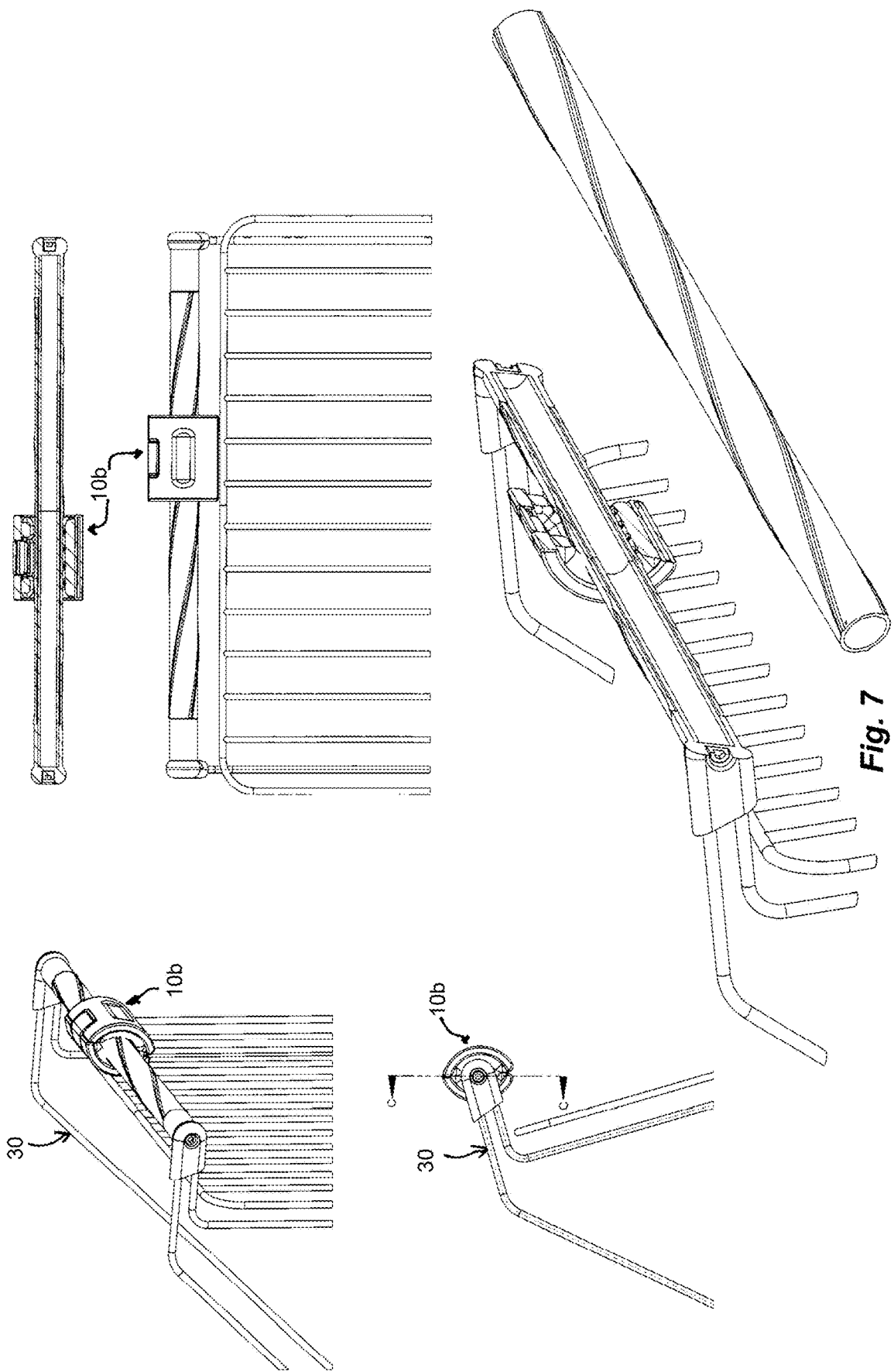
FIG. 7 illustrates the applicator device of FIGS. 5 and 6 in use on an elongate three-dimensional object in the form of a trolley handle, the trolley handle including a rifled cover.

As shown in FIG. 6, the hinge member 40 may be an articulated hinge which, in addition to allowing rotation of the sections 16, enables a spaced apart distance between the two sections 16 to also be adjustable. Accordingly, the articulated hinge member 40 may accommodate elongate objects 12 of varying cross-sectional shapes and dimensions, e.g. circular cross-section objects of different diameter. One application where a device capable of accommodating multiple different diameters is a shopping trolley where a shopper may prefer to apply sanitizing liquid or gel not only the shopping trolley handle but also the adjacent metallic frame member(s) which toddlers and children may be inclined to contact when seated in the trolley. In the particular embodiment shown, the device 10b is configured to allow clamping onto objects of multiple different diameters. According to a particular embodiment, the device 10b may be configured to clamp onto objects ranging from approximately 25 mm to 90 mm in diameter. The skilled person would appreciate that features of the device 10b such as overall size and shape can be varied to accommodate a wide variety of objects of different shape and dimension.

It will also be appreciated in FIG. 6 that when accommodating objects of large cross-sectional diameter, the transfer means 22 is unlikely to contact the entire circumference. However, as described above with reference to device 10a, the device 10b can be easily rotated once it is engaged with the object to ensure uniform application of the liquid or gel, and various examples of facilitating rotation of the device during movement along the object are described herein.

As further shown in the embodiment of FIGS. 5 to 8, the applicator device 10b may include a biasing means 42 (plastic springs in this particular embodiment) that cause the two sections 16 to be rotatably biased in a direction towards one another such that the device 10b will want to close at all times, clamping on the closest diameter so it can be used on a range of handles, rails, etc. By accommodating a range of objects of different dimension, a user need not purchase multiple different devices and is able to use a single device for multiple purposes (such as the shopping trolley handle/frame member examples described above). The device 10b is thus designed not only for simple manufacture and assembly, but also gives rise to efficiencies in use.

The springs 42, when configured in accordance with the embodiment shown, effectively act as torsion springs in that each includes a pin section 44 that is fixed inside a corresponding aperture 46 in the side of the hinge member 40 and a curved elastic section 47 which makes contact with the inner wall 24 of the reservoir body but at a location outside of the internal chamber 21. The pin section 44 is fixed inside the aperture 46 such that the curved elastic section 47 extends at an angle that causes it to provide a biasing force against the inner wall 24 when one attempts to rotate (open) the section 16 from a clamped position. In other words, when one attempts to rotate (open) the section, the curved elastic section 47 will start to become twisted and will exert a torque in the opposite direction, proportional to the amount (angle) it is twisted.

It should be appreciated that the applicator device 10a of the first described embodiment is configured for use on elongate objects of a predetermined cross-sectional dimension and may be manufactured accordingly. On the other hand, the applicator device 10b of the second embodiment is configured to be adjustable such that it contours to different cross-sectional shapes and/or dimensions.

The applicator device 10b is also configured to be squeezed or pressed to facilitate release of liquid or gel from inside the reservoir body 20. Also shown in the embodiment of FIGS. 5 to 8 are apertures 48 spaced along the contact surface 28 of the absorbent transfer means 22. These apertures 48 are co-aligned with openings 26 (which in this embodiment are also apertures) in the inner wall 24 of the reservoir body 20 and accommodate flow control devices 50. In the embodiment shown, the flow control devices are valves 50 having head 51 and feet 52 portions and each valve that is disposed linearly within the body 20 is connected by a rail portion 53. It will be appreciated that each head portion 51 includes a cylindrical lower end 54 and a grooved upper end 55 such that when the cylindrical lower end 54 is positioned in the openings 26, liquid or gel is unable to pass but when the grooved upper end 55 is positioned in the openings 26 liquid or gel is allowed to pass through the grooves.

The feet portion 52 of each valve 50 is designed to be resilient such that pressing the feet portion 52 towards the head portion 51 will result in a decrease in the height of the valve 50 and hence cause the head portion 51 to move closer to the outer wall 32 of the reservoir body 20. Accordingly, each valve 50 may be in the form of a one way valve moveable between a first position in which the openings 26 are blocked by the valve head lower end 54 and liquid or gel inside the reservoir body is prevented from passing through the corresponding opening 26, and second position in which the valve head 51 retracts and the grooved upper end 55 allows liquid or gel to pass through the openings 26 and enable the transfer means 22 to absorb same.

Movement of each one way valve 50 from the first to the second position may be caused by application of an external force to the outer wall 32 of the reservoir body 20 at a position adjacent the valve to cause the body to deform and thereby cause liquid or gel to want to move out of the chamber 21 through the one or more openings. The valve feet portion 52 is disposed inside the internal chamber 21 of the reservoir body 20 and may abut or be disposed sufficiently adjacent the outer wall 32 such that a force exerted on the outer wall causes the valve to be pressed and to move from the first to the second position. Pushing on the rail portion 53 may also cause pressure to be applied against multiple valves 50 associated with the rail portion 53.

Figure 8:
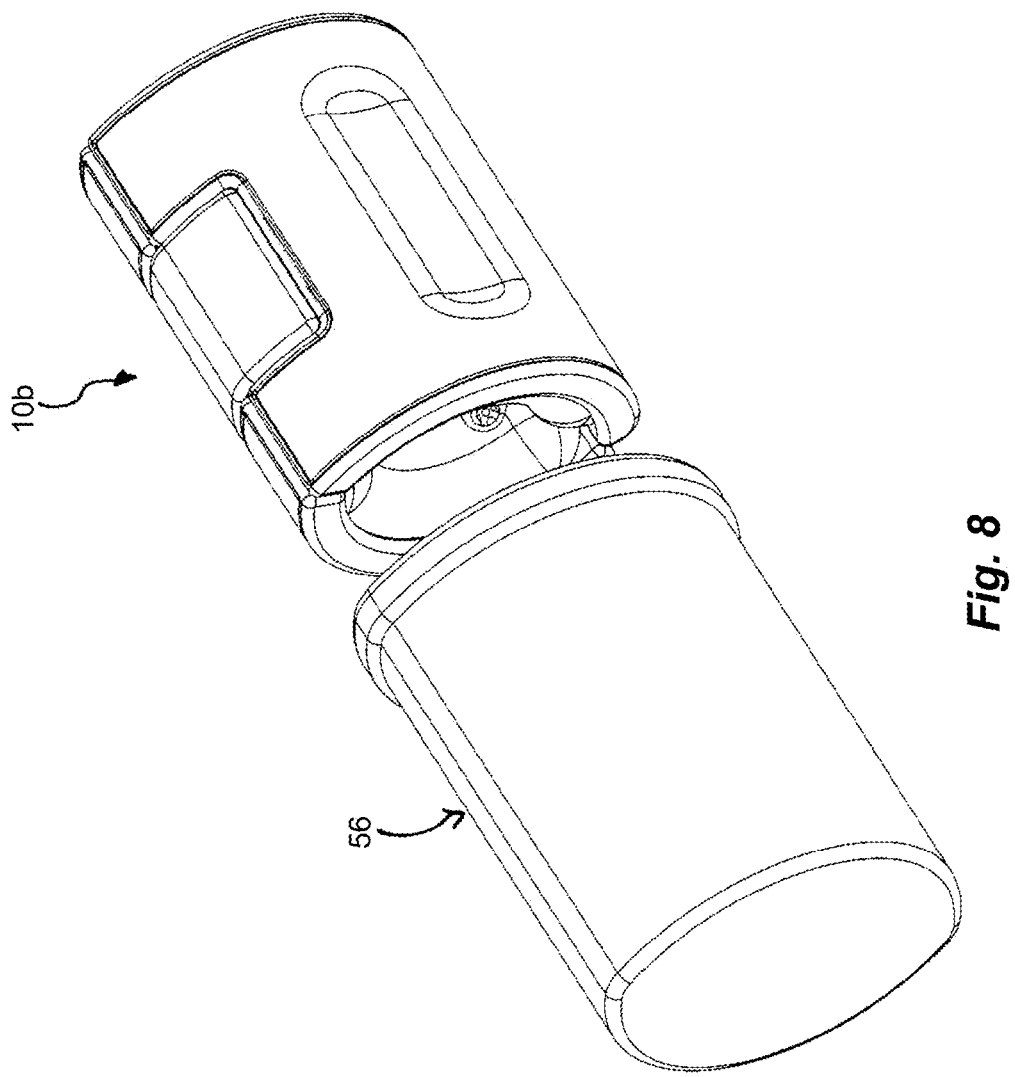
FIG. 8 illustrates a perspective view of the applicator device of FIGS. 5 to 7 together with an associated carry case.

As shown in FIG. 8, the applicator device 10b may be stored in a correspondingly sized and/or shaped carry case 56 which may be in the form of a pouch or container 56 for example. The skilled reader would appreciate that the ability to carry such a compact and portable device enables a person to easily store and then utilise the device on an as required basis, e.g. when visiting the grocery store or when attending any public event where the user may be required to make manual contact with one or more elongate objects that are potentially contaminated. The user may simply retrieve the device from their pocket or bag, attach the device to the object and slide the device along the object (rotating it if necessary) in order to ensure that the liquid or gel is dispersed across the surface area of the object. Such a device may therefore be used to clean, sanitise and/or disinfect the surface area of the object (depending on the particular liquid/gel formulation), and may also have the same effect on a user's hands upon making contact with the object (i.e. since the liquid or gel will be transferred to the user's hands after contact). In a grocery store scenario, this would have the added benefit of providing the user's hands with protection during subsequent interactions with people or objects, e.g. when handling additional goods such as grocery items, the surface of which may also be contaminated.

Once the device has been used, the user may then pack the applicator back into its storage case 56 for future use. Of course, the device need not be a portable device and, as described earlier, may be manufactured such that it is already integrated with an object such as a trolley handle, rail, balustrade, etc. For example, such a device could be permanently installed on rails and balustrades at sporting stadiums, and as described in greater detail below, their movement may even be automated such that the device requires no manual handling.

The applicator device could be manufactured for single use whereby the reservoir body 20 is filled with liquid or gel and is not refillable. Alternatively, the applicator device may be reusable such that the reservoir body 20 includes an access valve or lid (such as the valve 57 shown in device 10e in FIG. 11) that enables the reservoir body to be refilled with liquid or gel (e.g. by a liquid/gel injecting device which is not shown).

An applicator device 10c according to a further embodiment is shown across various views in FIG. 9, and it will be appreciated that the device 10c is configured for use on flat surfaces 58 of a three-dimensional object. For example, the device 10c could be used to apply cleaning, sanitising or disinfecting liquid or gel onto an elongate object having a square or rectangular cross-section. Since the two sections 16 of device 10c are hinged 60, it is to be understood that the angle between the two flat surfaces 58 need not necessarily be right-angled since the device 10c could be adjusted to any angle between 0 and 180 degrees for example.

In the embodiment shown in FIG. 9, it will be appreciated that each of the two sections 16 of the device 10c includes a reservoir body 20 having an internal chamber 21 and one or more openings 26 that extends along an inner wall 24 of each of the reservoir bodies 20 (in accordance with the previously described embodiments). However, in this particular embodiment, the one or more openings 26 is in the form of a single elongate opening rather than a plurality of apertures. Further, the transfer means 22 itself includes a plurality of circular indents 62, which do not extend all the way through the transfer means 22. In this way, the indents facilitate the transfer means 22 to slide across surfaces 58.

It is to be understood that whilst each of the three embodiments described above include minor variations, including for example the different types of openings in the reservoir body inner wall, the configuration of the transfer means, as well as the different types of hinges, these are described and illustrated by way of example only and each of the embodiments could be varied to incorporate one or more features of the other embodiment. For example, the device 10c of FIG. 9 may well incorporate the previously described flow control devices, and the device 10a of FIGS. 1-4 could also incorporate a transfer means having multiple circular indents across its contact surface. Indeed, it is to be understood that, if viable, any one of the embodiments described herein may well be configured to include one or more features from another embodiment.

As mentioned earlier, the movement of the devices 10a-10c, i.e. sliding of the device along the elongate object 12, need not be achieved manually and may well be achieved automatically which would provide clear benefits since one would not need to manually handle the device in order to apply cleaning, sanitising or disinfecting liquid or gel to a particular surface. FIG. 10 illustrates an example of a device 10d incorporating a drive unit 63 which houses a drive means 64.

In the embodiment shown, the drive means 64 is a drive motor and associated electronics 66, and an associated drive wheel 68. The drive motor and electronics 66 and drive wheel 68 are supported by one or more frame members 70, and whilst not shown, the drive motor and electronics 66 would also utilise a battery also supported by the one or more frame members 70, the battery providing power to the drive motor 66. The drive wheel 68 is positioned such that its rolling surface contacts the external surface 14 of the elongate member 12, and the skilled addressee would appreciate that when the drive wheel 68 is caused to rotate, its rolling surface will roll over the external surface 14 and cause the device 10d to move longitudinally there along. If the external surface 14 was rifled, as described in one or more previous embodiments, such rifling would cause the device 10d to rotate during its automated longitudinal movement, which would ensure full and uniform application of liquid or gel across the full surface area of the object's external surface 14.

As previously described, the device according to the previously described embodiments may be a single use device or a reusable device. In connection with the latter, the reservoir body 20 may be constructed of a material that is sufficiently resilient to ensure that, after being deformed to enable transfer of liquid, the body returns to its original shape for future use. Of course, the reservoir body 20 need not be deformable. In this regard, the reservoir body 20 could be constructed of a metallic material such as stainless steel, although if constructed of a non-deformable material such as stainless steel, another mechanism for releasing fluid from inside the metallic chamber would need to be utilised. For example, release of liquid or gel may be achieved solely as a result of interaction between the transfer means 22 and the external surface 14 of the object 12 or cover therefor, as previously described. Liquid or gel may also be caused to exit the chamber 21 of the reservoir body 20 through the one or more openings 26 by gravity (or centripetal force when the device is rotated), and/or through natural migration of gel from wet to dry areas or from higher concentrations to lower concentrations of gel or liquid.

The reservoir body 20 may be constructed of a transparent material to enable a user to view a level of liquid or gel in the reservoir body to determine whether the internal chamber requires re-filling. The reservoir body 20 may be constructed of any suitable plastic material such as polypropylene, polyethylene (high or low density), polyethylene terephthalate, or polylactic acid. It may be preferable to construct the reservoir body of an environmentally sustainable, recyclable material, and use of such materials may be feasible provided the reservoir body is able to satisfy its functional requirement as described herein.

In a further embodiment, the reservoir body may be partially permeable to the gel or liquid contained inside the chamber to provide protective gel or liquid to the outside of the reservoir body. This would ensure that the device 10 itself does not provide a surface through which a germ or virus could potentially be transmitted when a user attempted to manually press or move the device.

The transfer means 22 may be constructed of any suitable absorbent material such as sponge, including for example cellulose fibre foam. When the transfer means 22 is in the form of a non-absorbent insert, it could be constructed of a similar material to that of the reservoir body 20 for example. The liquid or gel contained in the reservoir body 20 may be made up of any suitable composition for cleaning, sanitising and/or disinfecting the external surface 14 depending on the application. For example, the reservoir body could be filled with any antiseptic, antibacterial or antiviral medium in circumstances where the device is to be used to kill viral and bacterial germs. In the case of a trolley handle application, for example, a similar composition to that currently used in conventional hand sanitisers may be used, although the invention is not intended to be limited to any one particular liquid or gel.

It will be appreciated in the embodiments of FIGS. 11-15 that the transfer means 22 is alternatively constructed of a substantially non-absorbent material, and rather than lining the inner wall of the reservoir body 20, the transfer means 22 forms the inner wall of the reservoir body 16. In this regard, applicator device 10e includes a transfer means 22 in the form of one or more non-absorbent inserts 72 (in the embodiment shown, two inserts 72 configured to be clamped together to form an annular shape) having a plurality of applicators 74 appropriately positioned to effect transfer of liquid or gel from inside the reservoir body 20 onto the external surface 14 (which may be an external surface of an object or a cover 38 for the object, as shown). It will be appreciated that in this embodiment, the transfer of liquid or gel is effected by rotation of the device 10 which causes applicators 74 to move across and dispense liquid or gel onto the surface 14 disposed between individual protrusions of rifling 36. In the embodiment shown, the rifling 36 is a quadruple helix rifling (i.e. four rifling lines that are radially spaced apart by equal angles and which correspondingly spiral around the cover such that their spaced apart distance does not substantially change).

Each of the two inserts 72 include side flanges 73 adapted to engage to connect the two inserts 72 and form said annular shape. Once engaged, the flanges 73 may be secured together permanently, e.g. by sonic welding. The insert flanges 73 are wedged between two opposed and correspondingly shaped reservoir body portions 20 which also form a substantially annular shape once engaged, and the engagement is such that a sealed internal chamber 21 is formed between each reservoir body portion and corresponding insert. The flanges 73 may include one or more apertures to enable liquid or gel to pass between the two internal chambers 21.

Each reservoir body portion 20 also includes a series of internal structural members 75 that are positioned and dimensioned to reinforce the corresponding internal sleeve in the required position and to improve the overall rigidity of the sleeves and the reservoir bodies 20.

The applicators 74a may be in the form of one or more roller ball applicators 74a, which each include a substantially hollow housing 76 formed in the insert(s) 72 (e.g. moulded into the insert annular bodies). Each hollow housing 76 may include a castellated cup 78 extending into the reservoir body at one end, such that the cup is in fluid communication with the reservoir body internal chamber 21, and houses a ball 80 at an opposing end adjacent the surface 14. As shown in the enlarged cross sectional views of FIG. 11, the ball 80 is positioned such that the ball 80 makes rolling contact with the external surface 14 when the applicator device 10e is engaged with the rifled cover 38 and moved therealong. When the applicator device 10e is moved along the cover 38 for applying cleaning, sanitizing and/or disinfecting liquid or gel to the external surface 14 thereof, the ball 80 rotates and thereby causes liquid or gel from inside the castellated cup 78 to be transferred into the hollow housing 76, around the ball 80, and onto the external surface 14. This flow of liquid or gel is shown in greater detail in FIG. 13 which depicts a simplified form of the roller ball applicator 74a, including a housing 76, cup 78 (non-castellated in this instance) and ball 80.

The skilled addressee will appreciate that when device 10e includes multiple ball applicators 74a, the balls effectively cause the device 10e to act similar to a ball bearing around the object 12 in that the balls make it very easy for the device 10e to rotate and be moved along the surface 14. In the embodiment shown, the rifling 36 is associated with a cover 38 that has been fitted over a shopping trolley handle, and when the device 10e is fitted onto such a cover 38, it will be appreciated that the eight balls 80 associated with the eight applicators 74a are positioned to roll across the surface 14 of the cover. The extent of movement is restricted by the rifling since the rifling is raised sufficiently high from the surface 14 to prevent the balls from rolling over the rifling lines.

Figure 11:
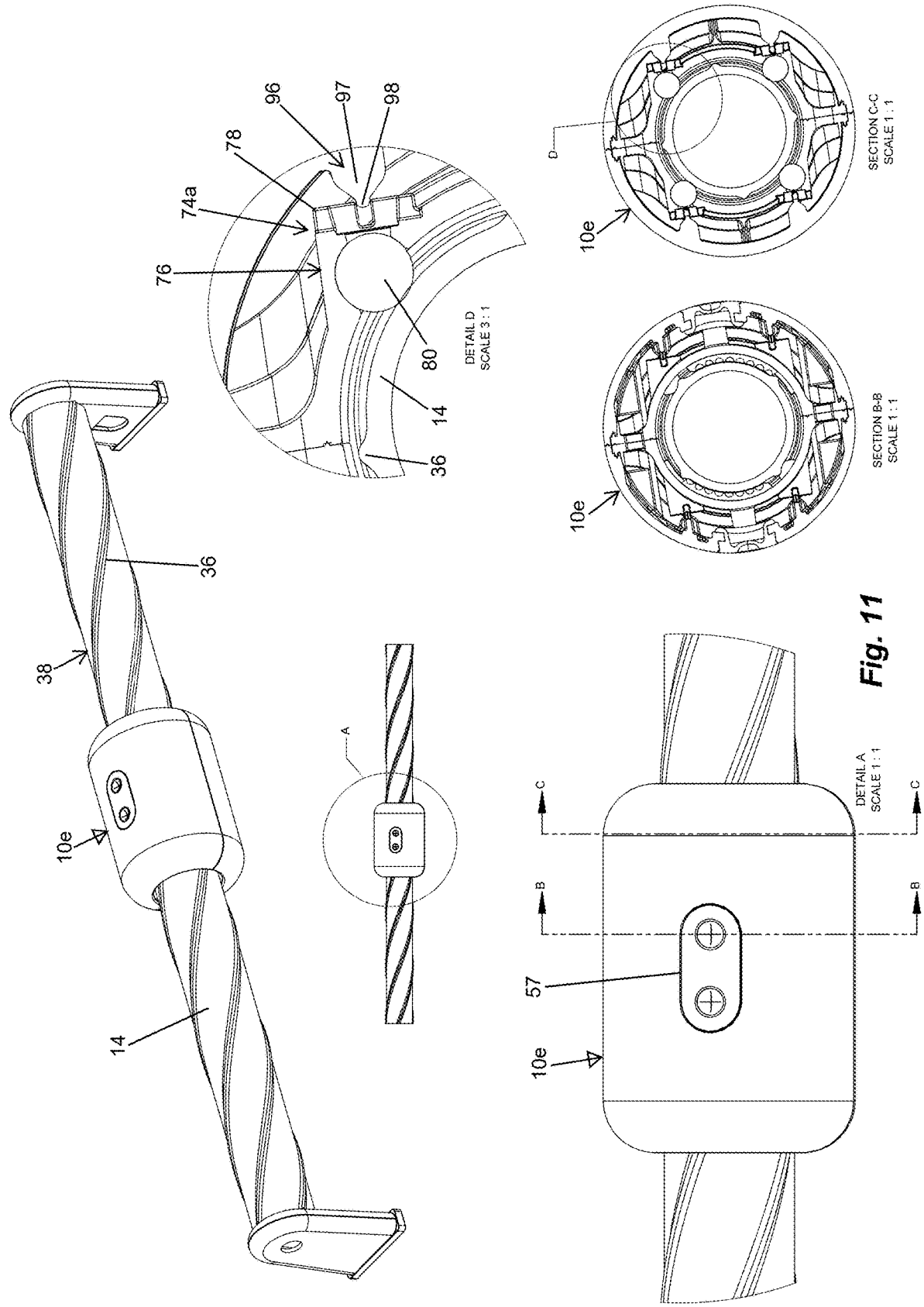
FIG. 11 illustrates various views of an applicator device configured in accordance with a still further embodiment of the present invention in which an internal wall of the reservoir body is formed by one or more non-absorbent inserts having a plurality of liquid/gel applicators.

Each applicator 74a associated with the non-absorbent inserts 72 may be separated radially by an angle that substantially corresponds with an angle of radial separation between each rifling line 36, as shown most clearly in the cross-sectional view of FIG. 11. Furthermore, once the applicator device 10e is engaged with the cover 38, the distance that each applicator 74 extends inwardly from the non-absorbent inserts 72 (e.g. the distance that the ball extends out from the surface of the insert 72 when using applicator 74a) substantially corresponds with a distance to which each rifling line 36 extends outwardly from the external surface 14. In this way, each rifling line 36 acts as a guide for each corresponding applicator 74 which when moved longitudinally is substantially prevented from crossing over the corresponding rifling line 36 and instead causes the applicator 74 to move alongside the rifling line 36, thereby imparting rotary motion to the applicator device 10e. In the example shown in FIG. 11, there are four rifling lines 36 spaced by equal radial distances around the cover 38, and there are four applicators 74a associated with each of the two inserts 72 that are radially spaced by corresponding angles, however, other configurations and arrangements are possible.

In the embodiment shown, the applicators 74a are positioned such that there are two balls positioned in each of the four channels defined by the four rifling lines and, in particular, the balls are positioned such that if one ball at one end of the device is positioned at the centre of a channel extending between two rifling lines, then a ball at the opposite end of the device located in the same channel will also be located at the centre of the channel. In other words, the balls at one end of the device may be disposed from balls at the other end of the device at an angle that corresponds with the angle of spiraling of the rifling lines. The skilled person will appreciate that this particular orientation of balls at opposing ends of the device 10e allows some freedom of movement (i.e. some clockwise and anti-clockwise rotation of the device even when the device is not moving longitudinally) but this radial movement is limited by the extent to which the rifling lines are radially separated. The further apart the rifling lines are spaced, the greater the range of radial movement that is possible. In any event, it will be appreciated that the one or more rifling lines act as a guide for the balls 80 when the device is caused to slide along the shopping trolley handle, and since the rifling lines are spiraled, they will cause the device 10e to rotate as the device is moved along the object.

Additional means of guiding the device 10e during movement along the object may be utilised. For example, the embodiment of FIGS. 11 and 12 further include a slide 81 that is attached along the inner surface of each insert 73 and oriented (angled) correspondingly with a channel defined between two adjacent rifling lines. The slide 81 is sized to fit inside the channel between the two adjacent rifling lines. By including slide 81, the rotation of the device is further restricted in that the balls 80, whilst remaining capable of longitudinal spiraled movement when the device is moved along the object, are no longer freely rotatable in a radial direction, i.e. between two adjacent rifling lines as previously described. Each ball 80 effectively becomes radially fixed in one location between two adjacent rifling lines (e.g. in a middle radial position between two rifling lines).

The slide may be attached to the insert using any suitable means. In the embodiment shown, each slide 81 includes at least one pin 83 that is configured to be received in and retained by a correspondingly positioned female socket 85 moulded into the sleeve 73.

Figure 12:
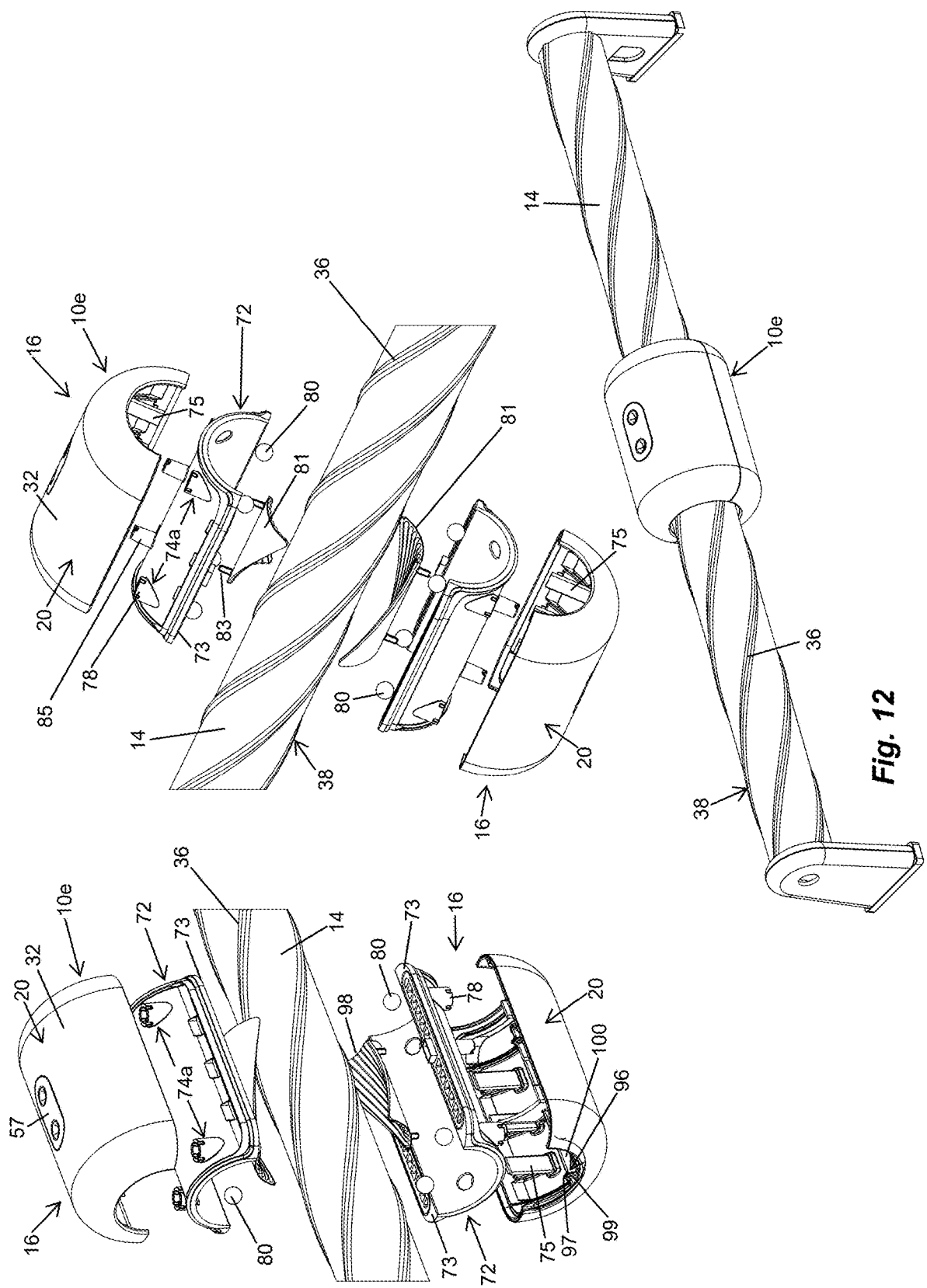
FIG. 12 illustrates various additional views of the applicator device of FIG. 11.
Figure 13:
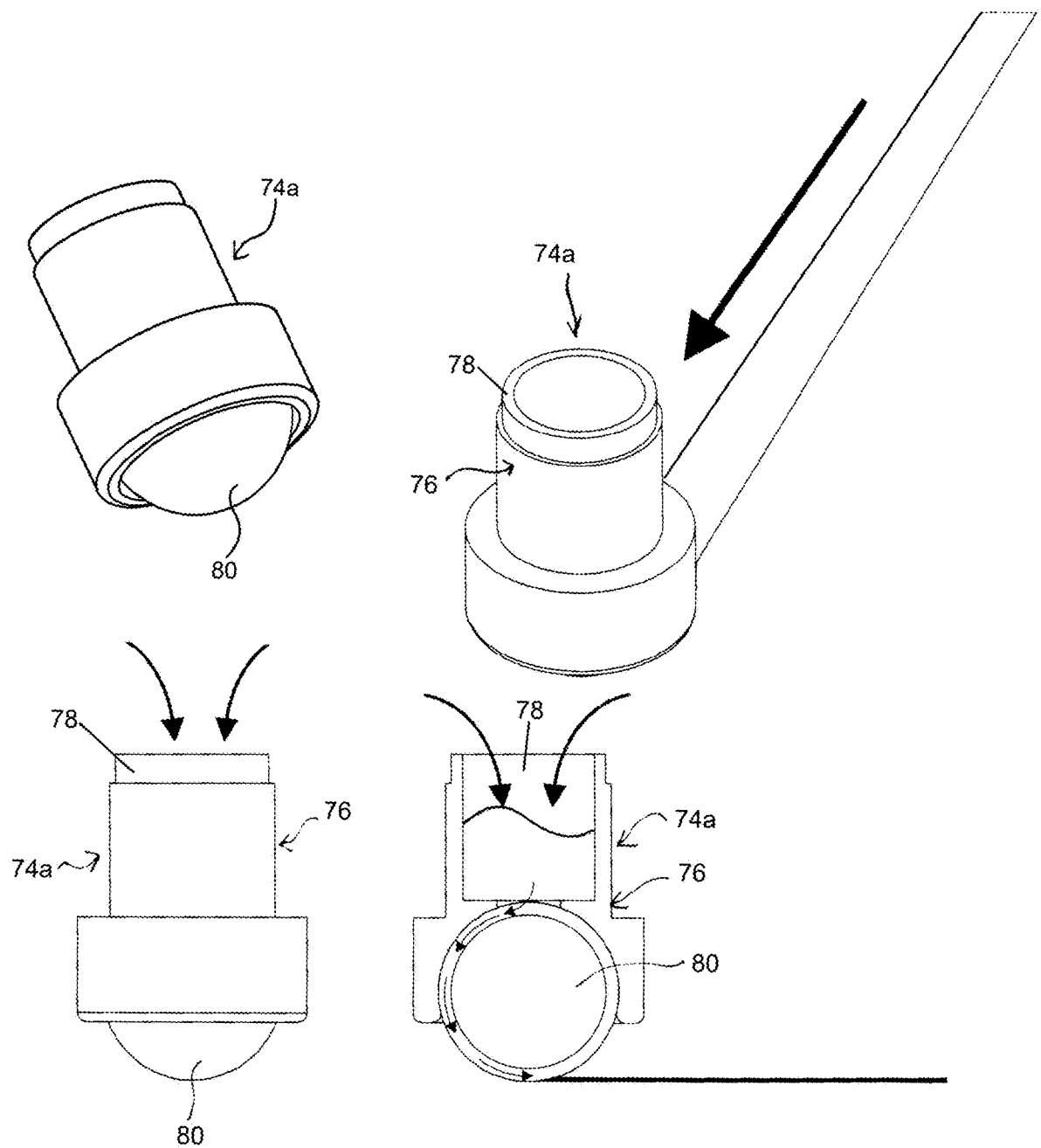
FIGS. 13-16 illustrate various views of different types of applicators that may be utilised with the non-absorbent inserts of FIGS. 11 and 12.

The slide 81 may also be configured in a number of different ways depending upon the desired application. For example, the slide 81 may be configured such that it acts solely as a guide without making contact with the surface 14 (as shown in FIGS. 11 and 12). In an alternative embodiment (not shown), the slide 81 could be raised further from the insert so as to make contact with surface 14 and thereby act to spread liquid or gel dispensed by the leading applicators 74. Of course, the use of the slide 81 is optional and if the slide 81 is not used, the device 10e will behave in the manner previously described, i.e. whereby the balls 80 and hence the device 10e are capable of being some radial movement to the extent permitted by the rifling lines. As described above, the radial movement will be restricted according to the minimum radial disposition between two adjacent rifling lines associated with cover 38 between which a ball is located.

It is to be understood that a slide 81 may also be used in the previously described embodiments in which absorbent pads are used to line an internal surface of a reservoir body and to transfer liquid or gel from inside the reservoir body onto the surface 14. For example, the absorbent pad itself could act as a slide, whereby the absorbent pad is shaped and oriented to be guided between adjacent raised rifling lines.

The reason the cup 78 associated with each applicator 74a in FIGS. 11 and 12 is castellated is to facilitate entry of liquid or gel from inside the reservoir body chamber 21 into the cup during rotation of the device 10e. In this regard, as the device is rotated, the cup 78 picks up fluid, and the amount of fluid that is able to enter the cup may depend upon the level of castellation. According to an embodiment, each cup may be sufficiently castellated to ensure that sufficient liquid or gel is picked up by the cup to last for a full rotation of the device 10e. In other words, when the device 10e is rotated, the gel inside the cup is dispensed through the rolling ball 80 and at the same time, the cup 78 is effectively refilled by movement of liquid or gel into the cup, including through the castellations. The cups 78 may also include a means of directing liquid or gel into the cups during rotation of the device 10e, as described in greater detail below.

Figure 14:
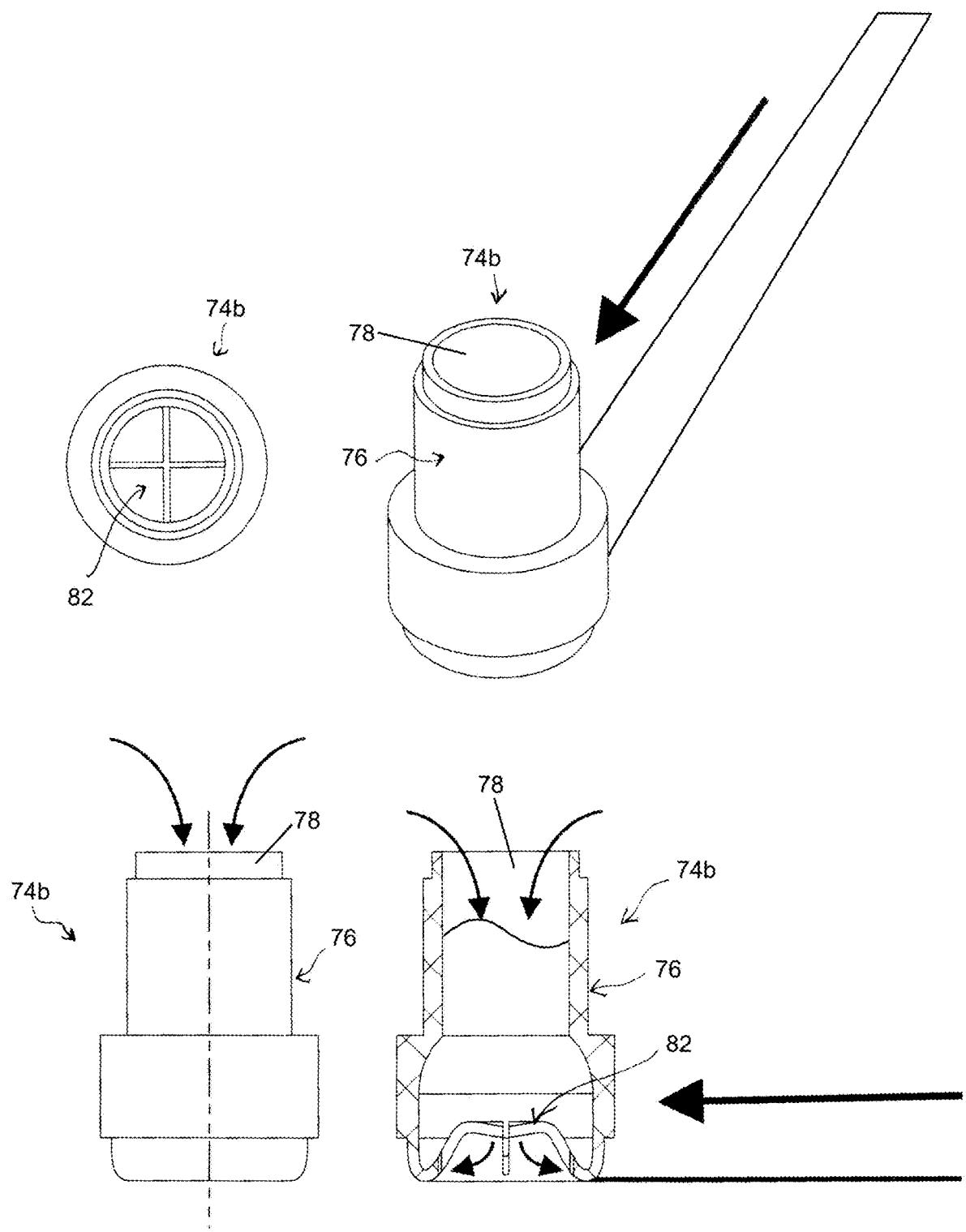

FIG. 14 shows an example of an applicator according to an alternate embodiment, i.e. a pressure flap applicator 74b that also includes a substantially hollow housing 76 including a cup 78 (non-castellated in this instance) at one end, and extending into the reservoir body internal chamber at the other end. In particular, the housing 76 terminates in X-shaped flaps 82 which in their normal state do not allow flow of liquid or gel therethrough. The X-shaped flaps 82 are raised and positioned such that when a sufficient pressure from liquid or gel that is caused to move from the reservoir body 16 into the cup 78 and towards the X-shaped flaps 82 is applied (e.g. by rotation of the device 10e), the flaps open and thereby allow liquid or gel from inside the reservoir body 16 to be transferred into the hollow housing 76, through the flaps 82, and onto the external surface 14, with the flaps returning to their original state once application of said pressure ceases.

Figure 15:
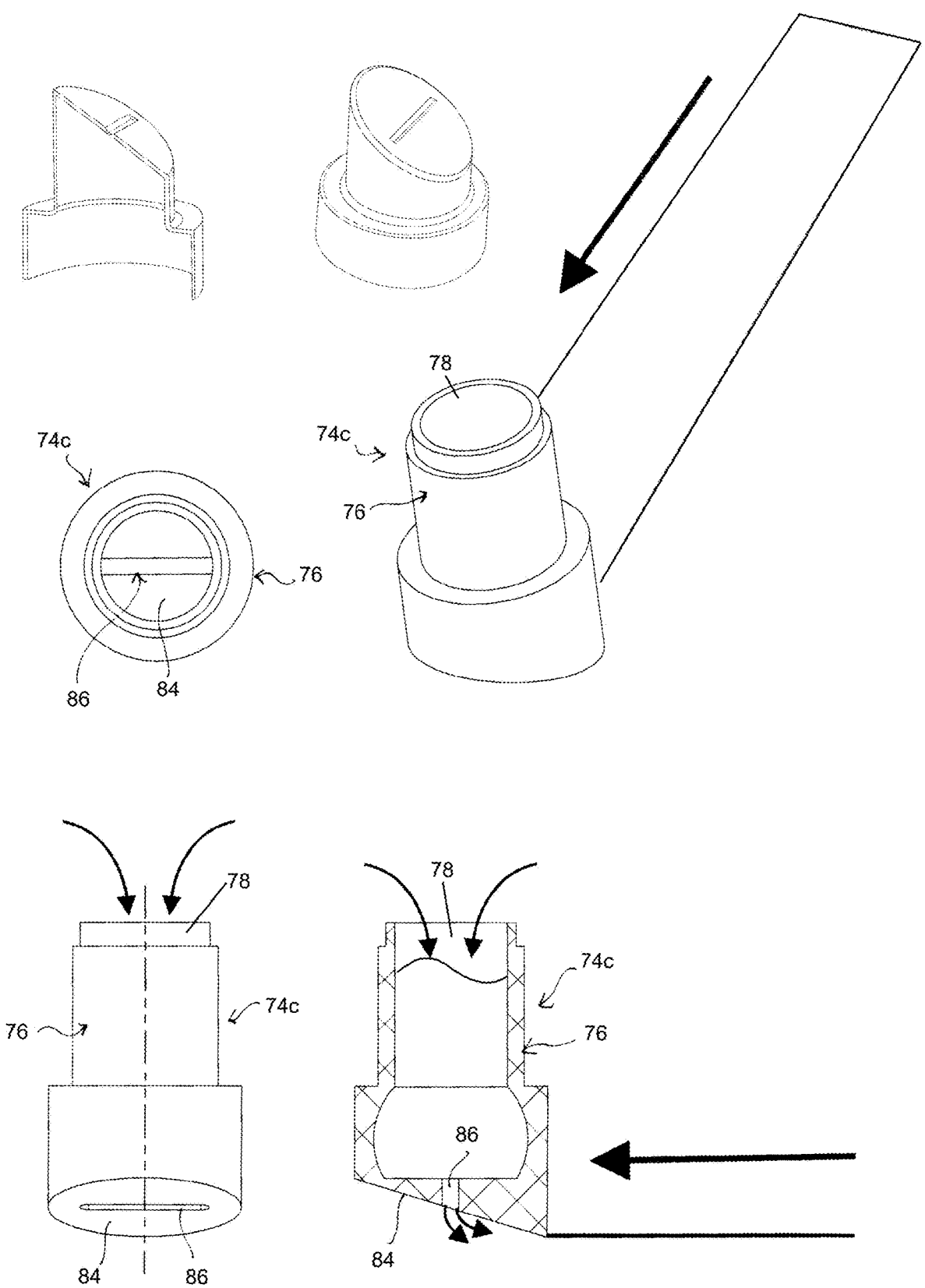

FIG. 15 shows an example of an applicator according to a further alternate embodiment, i.e. a slit-type applicator 74c that also includes a substantially hollow housing 76 including a cup 78 (non-castellated in this instance) at one end, and extending into the reservoir body internal chamber at the other end. In particular, the housing 76 terminates in a tapered surface 84 having a slit 86 at an opposing end which in its normal state does not allow flow of liquid or gel therethrough. The tapered surface 84 and associated slit 86 are configured such that the tapered surface makes contact with the external surface 14 when the applicator device 10e is engaged with the cover 38 and is moved therealong. In this embodiment, when the applicator device 10e is moved along the cover 38 for applying cleaning, sanitizing and/or disinfecting liquid or gel to said external surface 14, the contact between the tapered surface 84 and the external surface 14 causes liquid or gel from inside the reservoir body 16 to be transferred into the hollow housing 76, through the slit 86, and onto the external surface 14.

Figure 16:
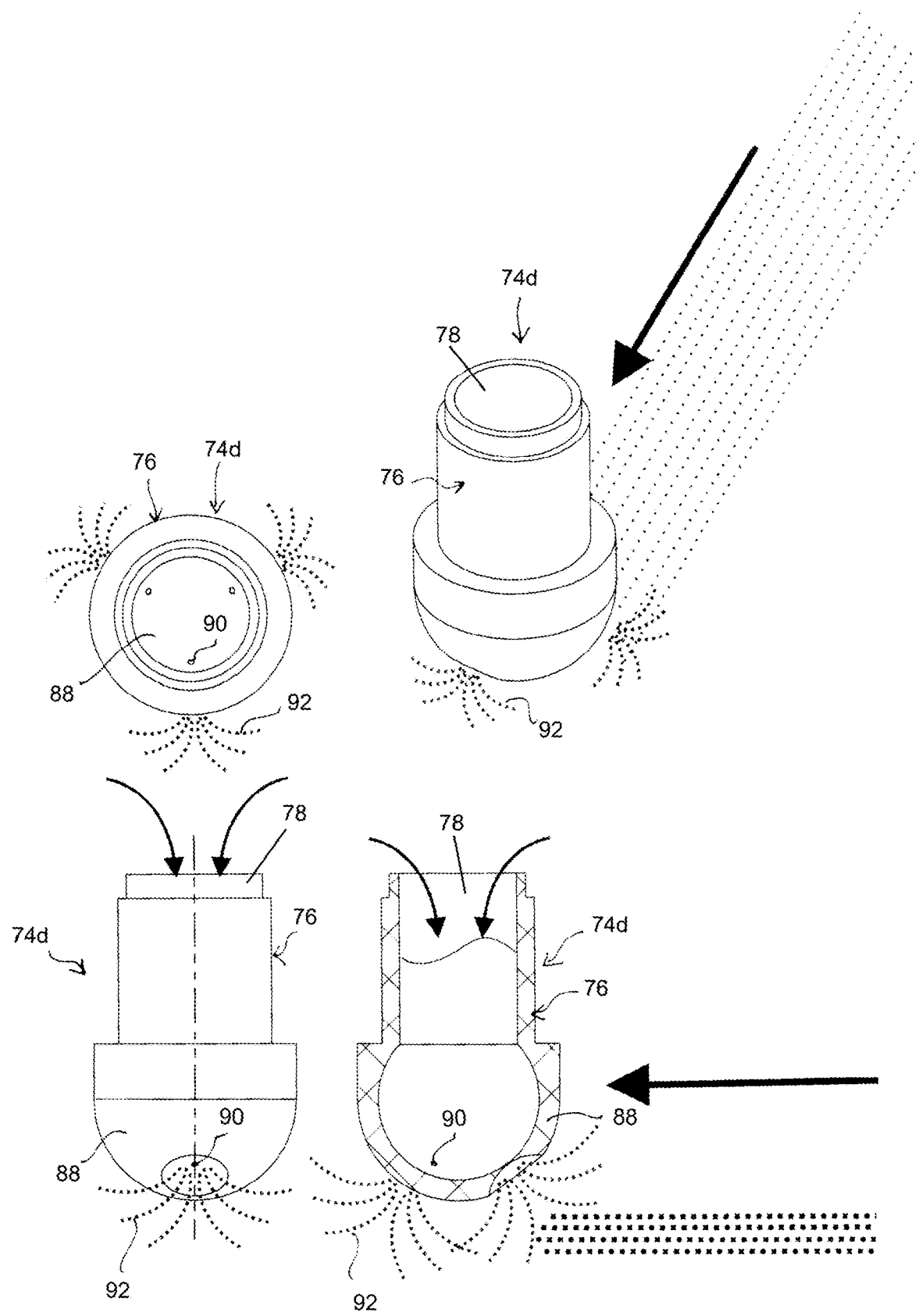

FIG. 16 shows an example of an applicator according to a still further alternate embodiment, i.e. a spray-type applicator 74d that also includes a substantially hollow housing 76 including a cup 78 (non-castellated in this instance) at one end, and extending into the reservoir body internal chamber at the other end. In particular, the housing 76 terminates in a bulb 88 including a plurality of apertures 90 which in their normal state do not allow flow of liquid or gel therethrough. The plurality of apertures 90 are configured such that when a sufficient pressure from liquid or gel that is caused to move from the reservoir body 16 into the cup 78 and towards the plurality of apertures 90 is applied (e.g. by rotation of the device 10e), the plurality of apertures 90 allow liquid or gel from inside the reservoir body to be transferred into the hollow housing 76 and onto the external surface 14 by way of a burst 92 of air and liquid or gel through the plurality of apertures 90, wherein the burst 92 ceases once application of the pressure ceases.

In one or more of the different applicator embodiments described above which require liquid or gel to move from the reservoir body into the cup 78, the reservoir body 16 may include a means of facilitating or directing flow of liquid/gel into the cup 78. In the embodiment shown in FIGS. 11 and 12, the means of facilitating or directing flow is in the form of a plurality of protruding pins 96 extending inwardly with respect to the reservoir body outer wall 32. Each inwardly directed protruding pin 96 facilitates flow by being located in a position substantially coaxial with each cup 78 in order to direct liquid/gel therein, and by extending a short distance into the cup 78.

In particular, according to the embodiment shown, the protruding pin 96 includes at least one web portion 97 that terminates in a nipple 98 that extends a short distance into the cup in alignment with a space defined by radially opposed pairs of adjacent cup castellations, as shown in the enlarged view of FIG. 11. In this way, the web portion 97 is shaped and elevated in a position over the cup (such that it does not make direct contact) to direct moving liquid or gel in. The three-dimensional shape of a protruding pin 96 can be seen in FIG. 12 where it will also be appreciated that the web portion 97 may include additional reinforcing web portions 99. In the embodiment shown, these form a cross-shape with web portion 97. In addition, the embodiment of FIG. 12 shows that more than one protruding pin may be linked by a rail portion 100 which may also serve to provide additional rigidity to the device 10e. The skilled addressee would appreciate that by providing an obstacle, any meniscus or similar fluid retaining effect associated with the liquid or gel is broken and hence the flow of the liquid or gel into the cup 78 is facilitated by the pin 96.

An alternative to the use of a raised slide 81 for spreading dispensed liquid or gel across surface 14 during movement of the device 10e may be in the form of a set of inwardly directed brushes (not shown). For example, in each of the different applicator embodiments shown in FIGS. 11 to 16 and described above, the one or more non-absorbent inserts may also include at least one set of inwardly directed brushes (not shown) extending towards the external surface 14 such that the set of brushes contact the external surface 14 when the applicator device 10e is clamped onto the cover. The set of brushes may be disposed such that when the applicator device 10e is moved longitudinally along the cover 38 for applying cleaning, sanitizing and/or disinfecting liquid or gel to the external surface 14, the set of brushes are caused to move over any liquid or gel that has been transferred by each applicator and disperse same over an increased surface area.

The skilled addressee would now appreciate the advantages associated with using the devices 10a to 10e of the present invention. For example, by using the device 10e shown in FIGS. 11 and 12, it may be possible for a user of a shopping trolley to cause the device 10e to slide (rotate) from one end of the shopping trolley handle to the other with minimal effort in order to apply sanitizing liquid or gel onto the shopping trolley handle cover prior to enable transfer of same into a user's hands when handling same. Due to the action of the ball bearings, a user may be able to tap the device 10e, for example using a single finger, to cause it to move from one end of the handle to the other, minimising the amount of manual contact required to cause sanitizing liquid or gel to be uniformly applied across the surface 14 of cover 38. Alternatively, the device could be automatically driven. Whilst utilisation of roller balls and the other applicators described may only dispense "lines" of liquid or gel as they move across the surface 14, this will be sufficient since there are two balls in each channel and hence any areas not covered by the leading applicator will likely be covered by the trailing applicator. In any event, once the device has been moved from one end of the handle to the other, there is likely to be a sufficient release of liquid to enable a user to then handle the shopping trolley handle (cover) themselves and be confident that a sufficient amount of sanitizing liquid or gel has been transferred to their hands. The device 10e can be moved from one end of the handle to the other at regular intervals throughout a shopping experience if the user prefers to re-apply sanitizing liquid or gel.

Throughout this specification and claims which follow, unless the context requires otherwise, the word "comprise", and variations such as "comprises" and "comprising", will be understood to mean the inclusion of a stated feature or step, or group of features or steps, but not the exclusion of any other feature or step, or group of features or steps.

Any reference to prior art in this specification is not, and should not be taken as an acknowledgement, or any suggestion that, the prior art forms part of the common general knowledge.

The invention claimed is:

1. An applicator device for applying a cleaning, sanitizing and/or disinfecting liquid or gel to an external surface of an elongate three-dimensional object, or a cover configured to extend over the three-dimensional object, the applicator device including:
   one or more sections that form a shape substantially contoured with a cross-sectional shape of the three-dimensional object, or cover therefor, to enable the one or more sections to engage with the external surface, each or a combination of the one or more sections including:
   one or more hollow reservoir bodies configured to hold said liquid or gel; and
   a non-absorptive internal wall having associated therewith one or more applicators in operable communication with the one or more reservoir bodies to facilitate transfer of the liquid or gel from inside each reservoir body onto the external surface,
   wherein the one or more applicators comprise one or more spray-type applicators activated to impart a burst of air and liquid or gel onto the external surface, the one or more spray-type applicators configured such that transfer of the liquid or gel from inside the one or more reservoir bodies onto the external surface occurs through the one or more spray-type applicators in response to the applicator device being moved along the elongate three-dimensional object or cover.

2. The applicator device according to claim 1, wherein the applicator device is shaped to substantially correspond with at least a portion of the cross-section of the three-dimensional object or cover, and thereby enables at least partial engagement with the object or cover.

3. The applicator device according to claim 1, wherein the external surface of the object or cover includes one or more radial protrusions to facilitate movement of the applicator device along the elongate three-dimensional object or cover, and uniform application of the liquid or gel upon the external surface, the one or more radial protrusions including one or more raised rifling lines that spiral around the external surface of the object or cover along its length, the rifling lines imparting a rotary motion to the applicator device as the applicator is caused to move along the length of the elongate object or cover.

4. The applicator device according to claim 3, wherein the rifling is a double, triple or quadruple helix rifling.

5. The applicator device according to claim 3, wherein each applicator is separated radially by an angle that substantially corresponds with an angle of radial separation between each rifling line.

6. The applicator device according to claim 5, wherein once the applicator device is engaged with the object, the distance that each applicator extends inwardly from the non-absorptive internal wall substantially corresponds with a distance to which each rifling line extends outwardly from the external surface such that each rifling line acts as a guide for each corresponding applicator and substantially prevents the corresponding applicator from crossing over the corresponding rifling line and instead causes the applicator to move alongside the rifling line, which imparts a rotary motion to the applicator device.

7. The applicator device according to claim 5, wherein:
the non-absorptive internal wall further includes a slide attachment extending along an internal surface thereof and dimensioned to fit inside a spiral channel formed between at least two adjacent raised rifling lines, the raised rifling lines thereby acting as a guide for the slide to move throughout the spiral channel, and
the slide is sufficiently raised from the internal surface of the non-absorptive internal wall to cause liquid or gel that has been applied by one or more applicators to be spread across the surface of the corresponding channel.

8. The applicator device according to claim 1, wherein:
the one or more applicators include one or more roller ball applicators each having a substantially hollow housing including a first end that extends into the reservoir body and a ball at an opposing end, wherein:
the one or more spray-type applicators have a substantially hollow housing including a first end that extends into the one or more reservoir bodies and an opposing end terminating in a bulb including a plurality of apertures which in their normal state do not allow flow of liquid or gel therethrough, wherein:
the plurality of apertures are configured such that when a sufficient pressure from liquid or gel that is caused to move from the one or more reservoir bodies into the hollow housing and towards the plurality of apertures is applied, the plurality of apertures allow liquid or gel from inside the one or more reservoir bodies to be transferred into the hollow housing and onto the external surface by way of a burst of air and liquid or gel through the plurality of apertures, and
said burst of air and liquid or gel ceasing once application of said pressure ceases.

9. The applicator device according to claim 8, wherein:
the substantially hollow housing includes a cup at the reservoir body end of the housing, the cup configured to temporarily hold a volume of liquid or gel prior to transfer of same through the applicator onto the external surface,
the one or more reservoir bodies include a means of facilitating flow into each cup in the form of an inwardly directed protrusion associated with the reservoir body outer wall, each inwardly directed protrusion facilitating flow by:
being located in a position substantially coaxial with each cup to direct liquid/gel therein, and/or extending at least partially into the cup,
the cup is castellated and the inwardly directed protrusion is in the form of a protruding pin including at least one web portion that terminates in a nipple extending a short distance into the cup in alignment with a space defined by radially opposed pairs of adjacent cup castellations, and
the at least one web portion includes a main web portion that terminates in said nipple and additional reinforcing web portions which together form a substantially cross-shaped pin, wherein two or more of the pins disposed inside each reservoir body are linked by a rail portion.

10. The applicator device according to claim 1, wherein said object has a circular, square, rectangular or oval shaped cross section and the applicator device includes two sections and one or more associated biasing means that causes the two sections to be rotatably biased in a direction toward one another in an engaged position on the three-dimensional object or cover.

11. The applicator device according to claim 1, wherein movement of the applicator device along the elongate three-dimensional object or cover is achieved manually, or by a drive means associated with the applicator device, wherein the drive means is a drive motor housed inside an end unit of the applicator device, the drive motor causing an associated drive wheel to rotate, the drive wheel positioned such that the drive wheel makes frictional contact with the object or cover external surface and rotation thereof causes the applicator device to move relative to the external surface.

12. The applicator device according to claim 1, wherein one or more non-absorbent inserts form the non-absorptive internal wall and are constructed of a rubber-like material including one or more of Santoprene™ or ThermoPlastic Elastomer (TPE).

13. The applicator device according to claim 1, wherein the applicator device includes two sections connected by an articulated hinge which enables a spaced apart distance between the two sections to be adjustable such that the device contours to different cross-sectional shapes and/or dimensions.

14. The applicator device according to claim 1, wherein each reservoir body is made of a transparent material to enable a user to view a level of liquid or gel in the reservoir body.

15. The applicator device according to claim 1, wherein:
the reservoir body is deformable and made of a resilient material, or
the reservoir body is made of a plastic material including one or more of polypropylene, polyethylene (high or low density), polyethylene terephathalate, or polylactic acid, or
the reservoir body is not deformable and constructed of a non-resilient material.

16. The applicator device according to claim 1, wherein the liquid or gel is made up of a composition for cleaning, sanitizing and/or disinfecting the external surface of the three-dimensional object or cover, and wherein:
the applicator device is configured for single use whereby each reservoir body is filled with liquid or gel and is not refillable, or
the applicator device is re-usable whereby the reservoir body includes an access valve or lid that enables the reservoir body to be refilled with liquid or gel.

17. An elongate, three-dimensional object, or a cover therefor, having an external surface, the three-dimensional object or cover therefor including:
an applicator device configured in accordance with claim 1 for applying a sanitizing liquid or gel to the external surface in response to the applicator device being moved along the object or cover.

18. An applicator device for applying a cleaning, sanitizing and/or disinfecting liquid or gel to an external surface of a cover that extends over an elongate three-dimensional object of circular or oval cross-section, the cover including raised rifling lines that journal around the external surface of the cover along its length, the applicator device including:
one or more sections that together form an annular shape configured to encircle the elongate object, wherein each or a combination of the one or more sections includes:
a hollow reservoir body configured to hold said liquid or gel,
one or more non-absorbent inserts forming an inner wall of the reservoir body and including one or more applicators that facilitate transfer of the liquid or gel from inside the reservoir body onto the external surface, wherein:
  each applicator is separated radially by an angle that substantially corresponds with an angle of radial separation between each rifling line, and
  the distance that each applicator extends inwardly from the one or more non-absorbent inserts substantially corresponds with a distance to which each rifling line extends outwardly from the external surface such that each rifling line acts as a guide for each corresponding applicator, and such that when the applicator device is moved longitudinally the applicator is substantially prevented from crossing over the corresponding rifling line which instead causes the applicator to move along the rifling line to impart a rotary motion to the applicator device; and
wherein the one or more applicators comprise one or more spray-type applicators activated to impart a burst of air and liquid or gel onto the external surface, the one or more spray-type applicators configured such that application of the cleaning, sanitizing and/or disinfecting liquid or gel onto said external surface occurs through the one or more spray-type applicators in response to the device being moved along the rifled cover.

19. A liquid/gel applicator assembly for a three-dimensional elongate object, the assembly including:
  a cover for the three-dimensional elongate object, the cover configured to extend over the object and including one or more raised rifling lines that journal around the external surface of the cover along its length; and
  an applicator device including one or more sections that together form a shape substantially corresponding with the cross-sectional shape of the cover, wherein each or a combination of the one or more sections includes:
    a hollow reservoir body configured to hold cleaning, sanitizing and/or disinfecting liquid or gel,
    a non-absorptive insert disposed in the device and forming an internal wall and including one or more applicators; and
    wherein the one or more applicators are configured such that application of the cleaning, sanitizing and/or disinfecting liquid or gel to the external surface occurs through the one or more applicators in response to the device being moved along the object or cover.

20. An applicator device for applying a cleaning, sanitizing and/or disinfecting liquid or gel to an external surface of an elongate three-dimensional object, or a cover configured to extend over the three-dimensional object, the applicator device including:
  one or more sections that form a shape substantially contoured with a cross-sectional shape of the three-dimensional object, or cover therefor, to enable the one or more sections to engage with the external surface, each or a combination of the one or more sections including:
    one or more hollow reservoir bodies configured to hold said liquid or gel; and
    a non-absorptive internal wall having associated therewith one or more applicators in operable communication with the one or more reservoir bodies to facilitate transfer of the liquid or gel from inside each reservoir body onto the external surface;
  wherein the one or more applicators are configured such that transfer of the liquid or gel from inside the one or more reservoir bodies onto the external surface occurs through the one or more applicators in response to the applicator device being moved along the elongate three-dimensional object or cover;
  wherein the one or more applicators include one or more roller ball applicators each having a substantially hollow housing including a first end that extends into the one or more reservoir bodies and a ball at an opposing end, wherein:
    the ball is positioned such that the ball makes rolling contact with the external surface when the applicator device is engaged with the external surface and is moved therealong, and
    when the applicator device is moved along the object or cover for applying cleaning, sanitizing and/or disinfecting liquid or gel to said external surface, the ball rotates and thereby causes liquid or gel from inside the one or more reservoir bodies to be transferred into the hollow housing, around the ball, and onto the external surface.

21. The applicator device according to claim 20, wherein:
  the substantially hollow housing includes a cup at the reservoir body end of the housing, the cup configured to temporarily hold a volume of liquid or gel prior to transfer of same through the applicator onto the external surface,
  the one or more reservoir bodies include a means of facilitating flow into each cup in the form of an inwardly directed protrusion associated with the reservoir body outer wall, each inwardly directed protrusion facilitating flow by:
    being located in a position substantially coaxial with each cup to direct liquid/gel therein, and/or extending at least partially into the cup,
  the cup is castellated and the inwardly directed protrusion is in the form of a protruding pin including at least one web portion that terminates in a nipple extending a short distance into the cup in alignment with a space defined by radially opposed pairs of adjacent cup castellations, and
  the at least one web portion includes a main web portion that terminates in said nipple and additional reinforcing web portions which together form a substantially cross-shaped pin, wherein two or more of the pins disposed inside each reservoir body are linked by a rail portion.

22. An applicator device for applying a cleaning, sanitizing and/or disinfecting liquid or gel to an external surface of an elongate three-dimensional object, or a cover configured to extend over the three-dimensional object, the applicator device including:
  one or more sections that form a shape substantially contoured with a cross-sectional shape of the three-dimensional object, or cover therefor, to enable the one or more sections to engage with the external surface, each or a combination of the one or more sections including:
    one or more hollow reservoir bodies configured to hold said liquid or gel; and
    a non-absorptive internal wall having associated therewith one or more applicators in operable communication with the one or more reservoir bodies to facilitate transfer of the liquid or gel from inside each reservoir body onto the external surface;
  wherein the one or more applicators are configured such that transfer of the liquid or gel from inside each reservoir body onto the external surface occurs through the one or more applicators in response to the applicator device being moved along the elongate three-dimensional object or cover;

wherein the one or more applicators include one or more pressure flap applicators each having a substantially hollow housing including a first end that extends into the one or more reservoir bodies and terminating in X-shaped flaps at an opposing end which in their normal state do not allow flow of liquid or gel therethrough, wherein:

the X-shaped flaps are positioned such that when a sufficient pressure from liquid or gel that is caused to move from the one or more reservoir bodies into the hollow housing and towards the X-shaped flaps is applied, the flaps open and thereby allow liquid or gel from inside the one or more reservoir bodies to be transferred into the hollow housing, through the open flaps, and onto the external surface, and the X-shaped flaps return to their original state once application of said pressure ceases.

23. The applicator device according to claim 22, wherein:

the substantially hollow housing includes a cup at the reservoir body end of the housing, the cup configured to temporarily hold a volume of liquid or gel prior to transfer of same through the applicator onto the external surface, the one or more reservoir bodies include a means of facilitating flow into each cup in the form of an inwardly directed protrusion associated with the reservoir body outer wall, each inwardly directed protrusion facilitating flow by:

being located in a position substantially coaxial with each cup to direct liquid/gel therein, and/or extending at least partially into the cup, the cup is castellated and the inwardly directed protrusion is in the form of a protruding pin including at least one web portion that terminates in a nipple extending a short distance into the cup in alignment with a space defined by radially opposed pairs of adjacent cup castellations, and the at least one web portion includes a main web portion that terminates in said nipple and additional reinforcing web portions which together form a substantially cross-shaped pin, wherein two or more of the pins disposed inside each reservoir body are linked by a rail portion.

24. An applicator device for applying a cleaning, sanitizing and/or disinfecting liquid or gel to an external surface of an elongate three-dimensional object, or a cover configured to extend over the three-dimensional object, the applicator device including:

one or more sections that form a shape substantially contoured with a cross-sectional shape of the three-dimensional object, or cover therefor, to enable the one or more sections to engage with the external surface, each or a combination of the one or more sections including:

one or more hollow reservoir bodies configured to hold said liquid or gel; and a non-absorptive internal wall having associated therewith one or more applicators in operable communication with the one or more reservoir bodies to facilitate transfer of the liquid or gel from inside each reservoir body onto the external surface;

wherein the one or more applicators are configured such that transfer of the liquid or gel from inside the one or more reservoir bodies onto the external surface occurs through the one or more applicators in response to the applicator device being moved along the elongate three-dimensional object or cover;

wherein the one or more applicators include one or more tapered slit-type applicators each having a substantially hollow housing including a first end that extends into the one or more reservoir bodies and an opposing end terminating in a tapered surface having a slit which in its normal state does not allow flow of liquid or gel therethrough, wherein:

the tapered surface and associated slit are configured such that the tapered surface makes contact with the external surface when the applicator device is engaged with the external surface and is caused to be moved therealong, and when the applicator device is moved along the object or cover for applying cleaning, sanitizing, and/or disinfecting liquid or gel onto said external surface, the contact between the tapered surface and the external surface causes liquid or gel from inside the one or more reservoir bodies to be transferred into the hollow housing, through the slit, and onto the external surface.

25. The applicator device according to claim 24, wherein:

the substantially hollow housing includes a cup at the reservoir body end of the housing, the cup configured to temporarily hold a volume of liquid or gel prior to transfer of same through the applicator onto the external surface, the one or more reservoir bodies include a means of facilitating flow into each cup in the form of an inwardly directed protrusion associated with the reservoir body outer wall, each inwardly directed protrusion facilitating flow by:

being located in a position substantially coaxial with each cup to direct liquid/gel therein, and/or extending at least partially into the cup, the cup is castellated and the inwardly directed protrusion is in the form of a protruding pin including at least one web portion that terminates in a nipple extending a short distance into the cup in alignment with a space defined by radially opposed pairs of adjacent cup castellations, and the at least one web portion includes a main web portion that terminates in said nipple and additional reinforcing web portions which together form a substantially cross-shaped pin, wherein two or more of the pins disposed inside each reservoir body are linked by a rail portion.

* * * * *